(12) United States Patent
Suzuki et al.

(10) Patent No.: US 8,044,324 B2
(45) Date of Patent: Oct. 25, 2011

(54) SOLID WIRE

(75) Inventors: Reiichi Suzuki, Fujisawa (JP); Yu Umehara, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 901 days.

(21) Appl. No.: 11/940,600

(22) Filed: Nov. 15, 2007

(65) Prior Publication Data

US 2008/0128399 A1 Jun. 5, 2008

(30) Foreign Application Priority Data

Dec. 1, 2006 (JP) ................................ 2006-325377

(51) Int. Cl.
*B23K 35/34* (2006.01)
(52) U.S. Cl. .............. 219/146.23; 219/146.1; 219/145.1
(58) Field of Classification Search ............. 219/146.23, 219/146.1, 145.1
See application file for complete search history.

(56) References Cited

U.S. PATENT DOCUMENTS

| | | | | |
|---|---|---|---|---|
| 4,331,474 A | * | 5/1982 | Espy | 420/57 |
| 2003/0085211 A1 | * | 5/2003 | Ito et al. | 219/146.1 |
| 2003/0103859 A1 | * | 6/2003 | Hauser et al. | 420/34 |
| 2003/0189034 A1 | * | 10/2003 | Kataoka et al. | 219/146.1 |
| 2006/0118537 A1 | * | 6/2006 | Kim et al. | 219/145.1 |
| 2006/0163231 A1 | * | 7/2006 | Kobayashi et al. | 219/146.23 |

FOREIGN PATENT DOCUMENTS

| | | |
|---|---|---|
| JP | 5-305476 | 11/1993 |
| JP | 9-94667 | 4/1997 |
| JP | 9-239583 | 9/1997 |
| JP | 2922814 | 4/1999 |
| JP | 2001-96392 | 4/2001 |
| JP | 3345883 | 9/2002 |
| JP | 2005-254284 | 9/2005 |
| JP | 2006-26643 | 2/2006 |
| KR | 10-0501984 | 7/2005 |
| KR | 10-2006-0050038 | 5/2006 |

OTHER PUBLICATIONS

U.S. Appl. No. 11/945,062, filed Nov. 26, 2007, Suzuki et al.

* cited by examiner

*Primary Examiner* — M. Alexandra Elve
(74) *Attorney, Agent, or Firm* — Oblon, Spivak, McClelland, Maier & Neustadt, L.L.P.

(57) ABSTRACT

A solid wire contains C of 0.020 to 0.100 mass percent, Si of 0.25 to 1.10 mass percent, Mn of 1.20 to 1.65 mass percent, P of 0.008 to 0.017 mass percent, S of 0.045 to 0.150 mass percent, O of 0.0050 mass percent or less, N of 0.0050 mass percent or less, wherein $P*(O+N)*10^5 \leq 15$ is satisfied, and the remainder including Fe and impurities, wherein the relevant impurities contain Ti of 0.15 mass percent or less, B of 0.0050 mass percent or less, and Cr, Ni, Al, Nb, V, Zr, La and Ce of 0.20 mass percent or less respectively. According to such a configuration, a solid wire is provided, in which while increase in welding cost is controlled to the minimum, stability of wire feed, burn-through resistance, undercut resistance, and crack resistance are excellent, slag and spatter are hardly produced, hardness of weld metal is equal to or higher than that of base metal, and brittle fracture hardly occurs.

5 Claims, 5 Drawing Sheets

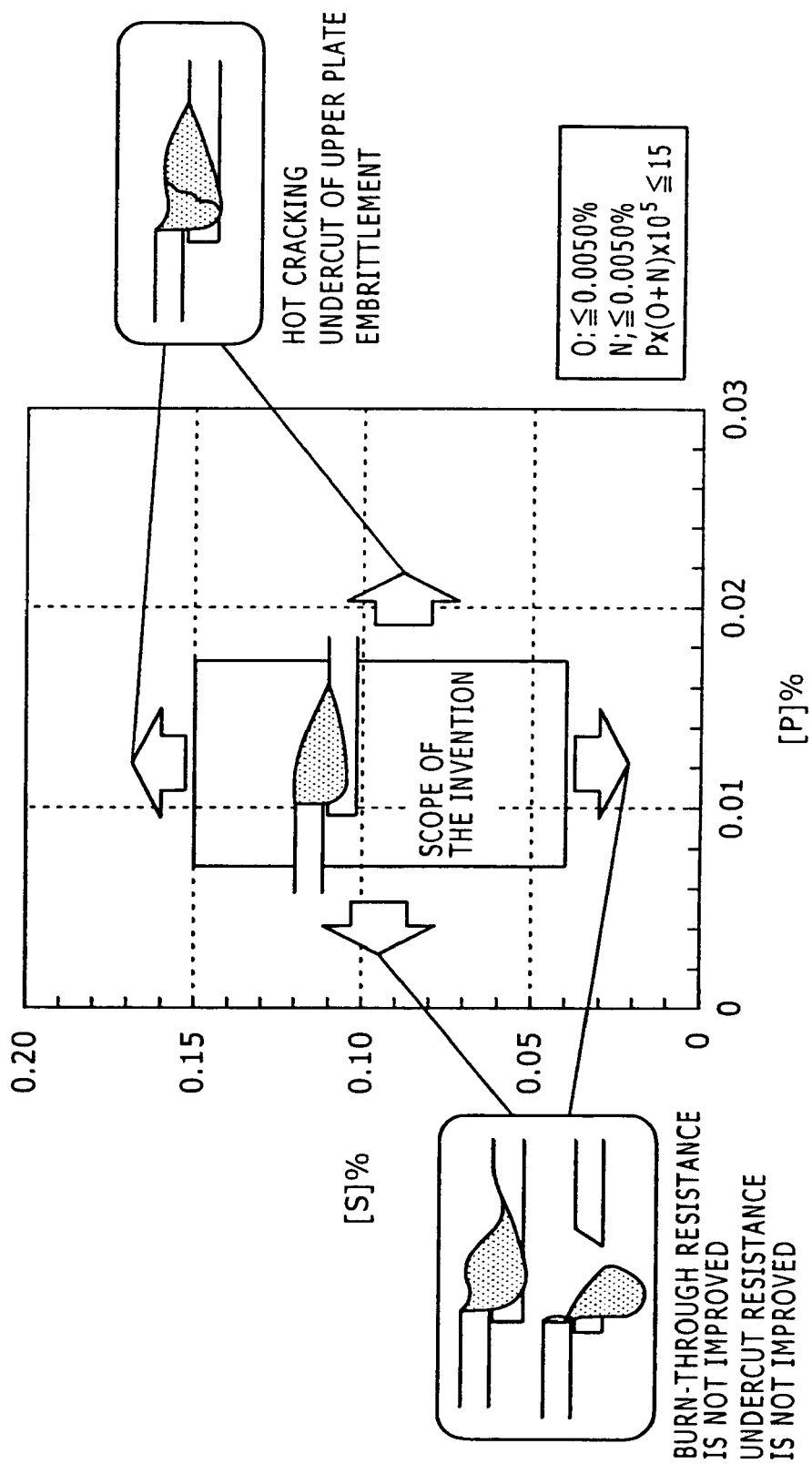

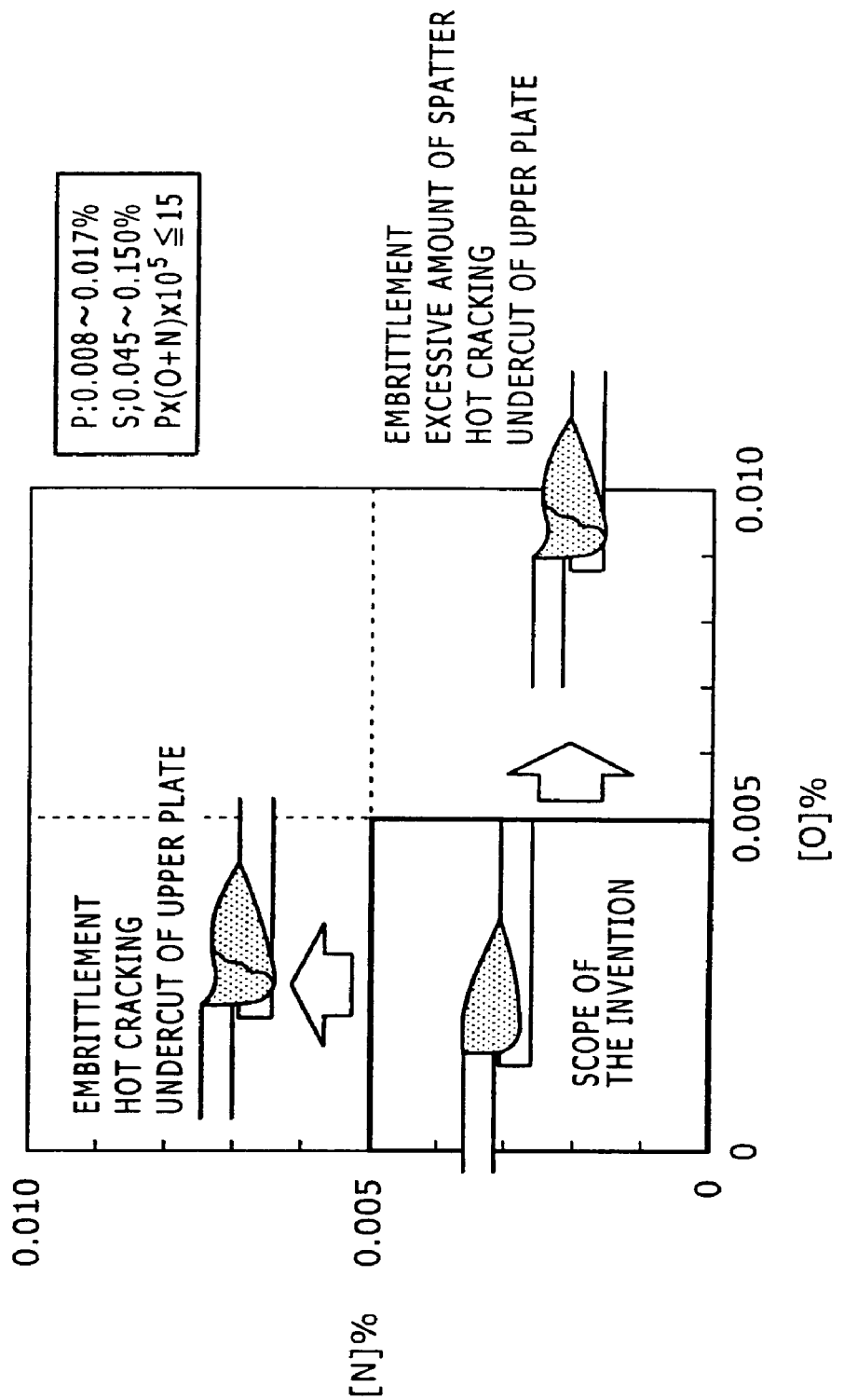

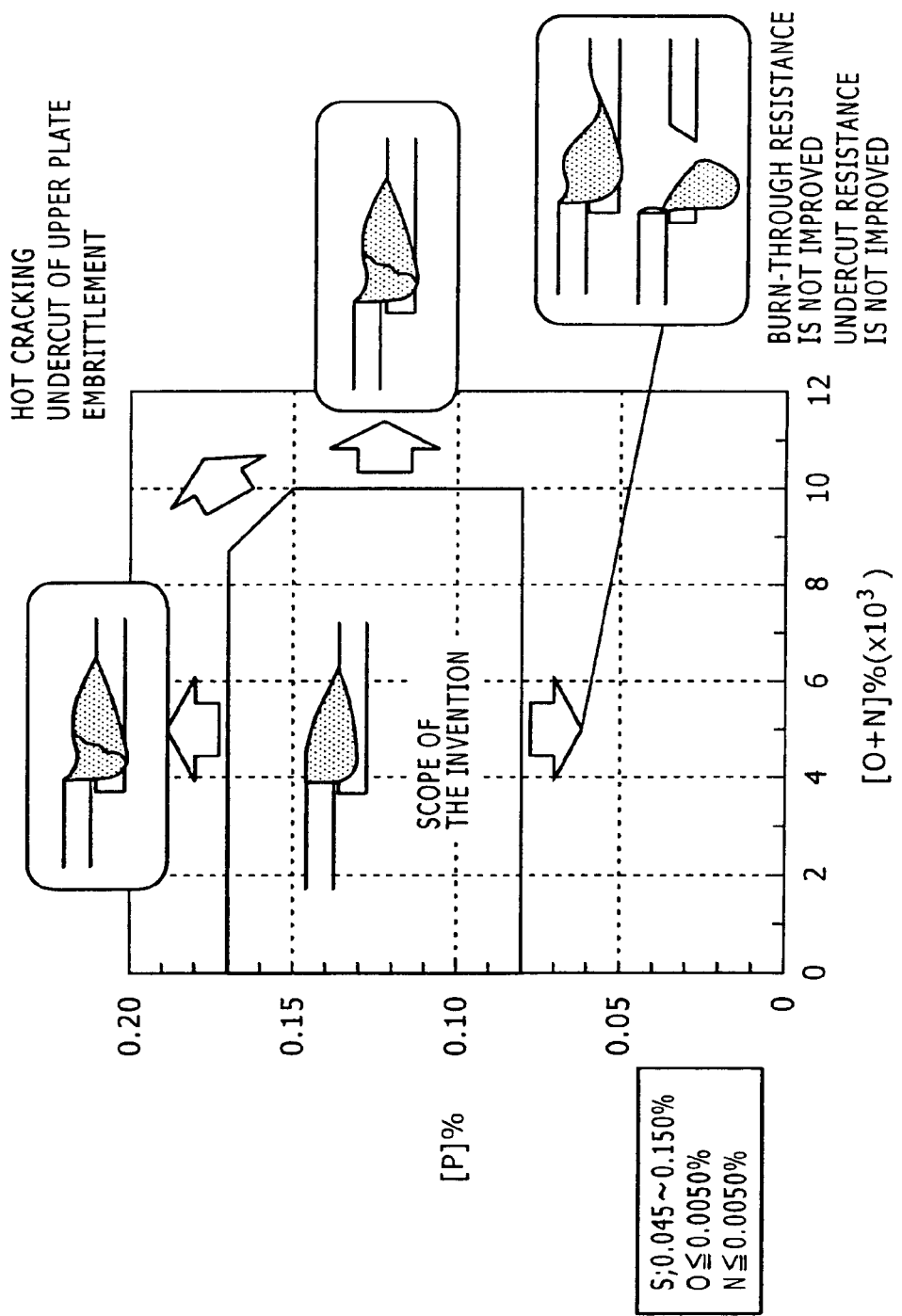

SOLID WIRE

BACKGROUND OF THE INVENTION

The present invention relates to a solid wire used for arc welding, and particularly relates to a solid wire for carbon steel usable for arc welding of a sheet.

DESCRIPTION OF RELATED ART

Recently, improvement in fuel consumption of a car is increasingly demanded in the light of the environmental issue. To response to this, change of a steel sheet to be used is progressively tried from usual mild steel having a tensile strength of 300 MPa or less to a high strength steel sheet having a tensile strength of 400 MPa or more so that sheet thickness is reduced to achieve lightweight.

Here, when sheet thickness is reduced, while substantially no difficulty is found in spot welding, a phenomenon that a steel sheet is locally melted due to arc heat, and eventually a hole is opened, so-called burn through easily occurs in arc welding.

Increase in strength of a steel sheet is typically achieved by cooling control during rolling, and increasing the amount of an element to be added into the steel sheet. However, when the amount of the element to be added into the steel sheet is increased, viscosity of a molten pool during arc welding is increased, thereby blendability is degraded and a weld toe is lose in thickness, so-called undercut tends to occur.

Furthermore, in a point of welding procedure, when welding speed is increased to improve efficiency of welding, arc precedes the molten pool, and thus arc tends to directly impinge upon a molten surface, so that burn through easily occurs. Even if burn through is not brought, when melting reaches to a back of the sheet material (this is sometimes called penetration welding), hot cracking is induced extremely easily.

For improving burn-through resistance, JP-A-2001-96392 describes that input heat per deposition is decreased by using a wire having a small diameter of 0.9 mm or less, which is specified in electric resistivity, so that burn through hardly occurs (that is, burn-through resistance is improved).

Moreover, specification of Japanese Patent No. 2922814 describes that Si+Mn and Si*(Si+Mn) in a composition of a wire are specified, and furthermore Ar is mixed with an extremely slight amount (3 to 7%) of $O_2$ gas, thereby burn-through resistance is improved. Such a technique is based on a synergistic effect of an effect of decreasing input heat per deposition by appropriately increasing electric resistivity of the wire, and an effect of decreasing depth of penetration by increasing a ratio of Ar in shielding gas.

Moreover, JP-A-9-94667 and specification of Japanese Patent No. 3345883 describe use of a special welding power supply tip applied with ceramic at an end. This increases electric resistance heat generation between a current supply point at an end of the welding power supply tip and an arc generation point, thereby heat input per deposition is decreased, so that burn-through resistance is improved, and occurrence of undercut is suppressed since arc force is restrained due to current reduction (that is, undercut resistance is improved).

Furthermore, JP-A-2005-254284 describes that Ar and $CO_2$ are used for shielding gas, and a large amount of $O_2$ (5.5 to 15%) is mixed to the shielding gas to change a convection direction of a molten pool, thereby undercut resistance is improved.

While it is previously experientially known that the burn-through resistance and the undercut resistance can be improved by vertical, downward welding, there is a difficulty that a welding position is limited, in addition, when a downward angle is excessively large, welding is hard to be controlled since drop of a bead may occur, or a large amount of spatter may be produced.

However, the wire having a small diameter as described in JP-A-2001-96392 tends to buckle due to the small diameter, and has a difficulty that weldability is degraded since stability of wire feed is bad. Moreover, there is a difficulty that such a wire small in diameter causes increase in cost, leading to increase in welding cost.

Moreover, the difficulty of bad burn-through resistance cannot be overcome only by using a simple wire as described in specification of Japanese Patent No. 2922814. Furthermore, there is a difficulty that when the ratio of Ar is increased in shielding gas in such a way, cost of the shielding gas is increased, leading to increase in welding cost.

On the other hand, use of the special welding power supply tip as described in JP-A-9-94667 and specification of Japanese Patent No. 3345883 increases tip cost, leading to increase in welding cost.

In the arc welding method described in JP-A-2005-254284, there is a difficulty that since the special shielding gas is used, cost of the shielding gas is increased, leading to increase in welding cost. In addition, since a large amount of oxygen is mixed, a large amount of slag or spatter is produced. The slag or spatter leads to degradation in painting adaptability of a weld. Furthermore, there is a difficulty that as the amount of oxygen contained in weld metal is significantly increased, inclusions are increased, consequently hot cracking tends to be induced (that is, crack resistance is bad).

In addition to the difficulties, for versatile and general sheet welding, it is required for the wire that hardness of weld metal is equal to or higher than hardness of base metal, brittle fracture does not occur in the weld metal, and stability of wire feed is good for smoothly performing welding.

SUMMARY OF THE INVENTION

It is desirable to provide a solid wire in which while increase in welding cost is controlled to the minimum, the stability of wire feed, burn-through resistance, undercut resistance, and crack resistance are excellent, slag and spatter are hardly produced, hardness of weld metal is equal to or higher than hardness of base metal, and brittle fracture does not occur.

A solid wire according to an embodiment of the invention, which is used for arc welding, contains C of 0.020 to 0.100 mass percent, Si of 0.25 to 1.10 mass percent, Mn of 1.20 to 1.65 mass percent, P of 0.008 to 0.017 mass percent, S of 0.045 to 0.150 mass percent, O of 0.0050 mass percent or less, and N of 0.0050 mass percent or less, wherein (content of P)*{(content of O)+(content of N)}*$10^5$≦15 is satisfied, and the remainder including Fe and impurities, wherein the relevant impurities contain Ti of 0.15 mass percent or less, B of 0.0050 mass percent or less, and Cr, Ni, Al, Nb, V, Zr, La and Ce of 0.20 mass percent or less respectively.

In the solid wire according to an embodiment of the invention, the content of each of C, Si, Mn, P and S is limited within a particular range, thereby viscosity and surface tension of a molten pool can be significantly decreased, and consequently the molten pool can be formed deep during arc welding. Thus, since a barrier effect of relieving arc force can be obtained, and thus depth of penetration can be decreased, burn-through resistance can be improved.

Moreover, in the solid wire according to an embodiment of the invention, since the viscosity and the surface tension of the molten pool are significantly decreased, even if undercut is generated, weld metal being melted in the molten pool flows into the relevant undercut portion due to gravity, therefore the undercut can be eliminated before a welded part is solidified (that is, undercut resistance can be improved).

In the solid wire according to an embodiment of the invention, the content of each of C, Mn, S and O is optimized, so that slag and spatter are hardly produced. In addition, the content of N is optimized to prevent inclusions from being abundantly produced, and a relationship between P, O and N is specified to prevent cracks or improve undercut resistance.

Furthermore, in the solid wire according to an embodiment of the invention, since a particular kind of impurity is contained within a particular range, thereby increase in viscosity and surface tension of the molten pool can be further prevented, shallowing of the molten pool during arc welding can be further prevented. Therefore, since the barrier effect of relieving arc force can be obtained more securely, and thus depth of penetration can be decreased, the burn-through resistance and the undercut resistance can be improved, consequently spatter and slag can be more hardly produced. In particular, B is controlled to be at a particular content or less, thereby the crack resistance can be further improved.

In the solid wire according to an embodiment of the invention, Mo is preferably contained at 0.30 mass percent or less.

In the solid wire according to an embodiment of the invention, since a strength of weld metal can be improved by adding Mo, and the content of Mo is controlled to be a particular content or less, thereby increase in viscosity and surface tension of the molten pool can be prevented, shallowing of the molten pool during arc welding can be prevented. Thus, since the barrier effect of relieving arc force can be securely obtained, so that depth of penetration can be decreased, the burn-through resistance and the undercut resistance can be improved, and consequently spatter can be hardly produced.

The solid wire according to an embodiment of the invention preferably includes K, Li, Na and Ca of 0.005 to 0.300 g/10 kg in total per the solid wire of 10 kg on a surface of the solid wire.

The solid wire according to an embodiment of the invention contains at least one element selected from such an element group on a surface of the solid wire within the particular range by coating or adhering the element, thereby the solid wire easily emits electrons, and therefore the relevant element operates as an arc stabilizer in welding using Ar and an oxidizing gas (such as $O_2$ and $CO_2$). Therefore, variation in arc length can be suppressed, consequently the burn-through resistance can be further improved.

The solid wire according to an embodiment of the invention preferably contains $MoS_2$ of 0.01 to 1.00 g per the solid wire of 10 kg on the surface of the solid wire.

The solid wire according to an embodiment of the invention contains $MoS_2$ on the surface of the solid wire within the particular range by coating or adhering $MoS_2$, thereby momentary fusion at a current supply point is decreased and thus resistance is decreased, and consequently feed stability of the solid wire can be improved.

A surface of the solid wire according to an embodiment of the invention may be covered with plated copper.

The solid wire according to an embodiment of the invention is covered with plated copper, which can improve stain resistance, wear resistance of a current supply tip, and drawability in wire production, and can provide improvement in productivity due to an effect of the improved drawability, and reduction in cost associated with the improved productivity.

According to the solid wire according to an embodiment of the invention, a solid wire can be made, in which while increase in welding cost is controlled to the minimum, the stability of wire feed, burn-through resistance, undercut resistance, and crack resistance are excellent, slag and spatter are hardly produced, hardness of weld metal is equal to or higher than hardness of base metal, and brittle fracture hardly occur.

BRIEF DESCRIPTION OF THE DRAWINGS

FIGS. 1A and 1B are diagrams schematically showing an aspect of arc welding, wherein FIG. 1A is a diagram schematically showing an aspect of arc welding using a usual solid wire, and FIG. 1B is a diagram schematically showing an aspect of arc welding using a solid wire according to an embodiment of the invention;

FIG. 2 is a diagram for explaining appropriate content ranges of P and S, which were established for completing the solid wire of an embodiment of the invention;

FIG. 3 is a diagram for explaining appropriate content ranges of O and N, which were established for completing the solid wire of an embodiment of the invention;

FIG. 4 is a diagram for explaining appropriate content ranges of O plus N and P, which were established for completing the solid wire of an embodiment of the invention;

DESCRIPTION OF THE PREFERRED EMBODIMENT

Next, the best mode for carrying out the solid wire according to an embodiment of the invention is described in detail.

The inventors noted behavior of the molten pool and behavior of the weld metal in the vertical downward welding, and made earnest study considering that if the molten pool and the weld metal were able to show the same behavior as that of the above without regard to welding positions such as positions of horizontal fillet welding, flat welding, horizontal welding, overhead welding, and vertical upward welding, arc welding was able to be performed more preferably.

Figure 1A:
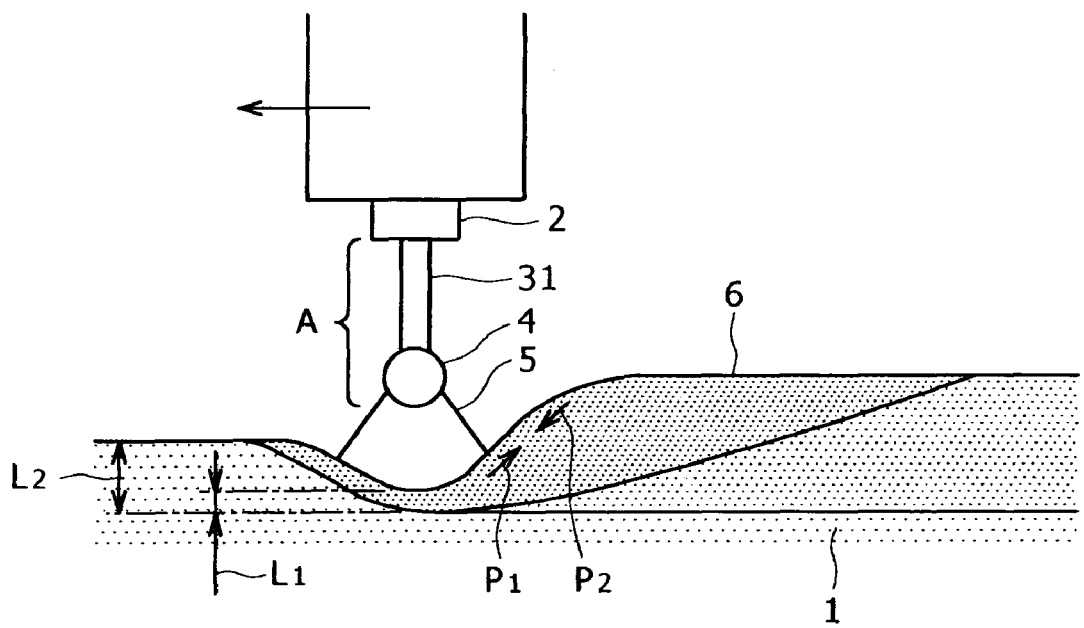
Figure 1B:
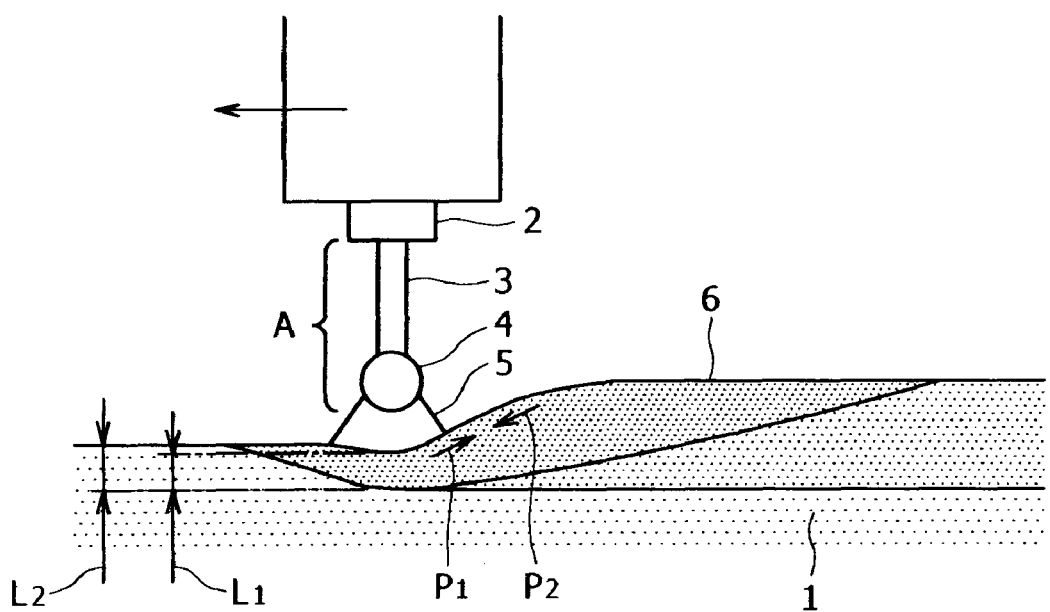

First, a principle of a solid wire according to an embodiment of the invention completed by the inventors is described with reference to FIGS. 1A to 1B. FIGS. 1A to 1B are diagrams schematically showing an aspect of arc welding, wherein FIG. 1A is a diagram schematically showing an aspect of arc welding using a usual solid wire, and FIG. 1B is a diagram schematically showing an aspect of arc welding using a solid wire according to an embodiment of the invention.

As shown in FIG. 1A, viscosity and surface tension of a molten pool 6 is large in arc welding using a usual solid wire 31. Therefore, since forcing up $P_1$ of the molten pool 6 by arc force and the surface tension becomes large compared with gravity $P_2$, lowering of the molten pool 6 itself by the gravity $P_2$ is decreased. That is, depth $L_1$ of the molten pool 6 directly below arc is decreased, and depth of penetration $L_2$ is increased.

Moreover, a portion from a current supply point between a tip 2 and a solid wire 31 (mainly an end of the tip 2) to a generation point of arc 5, so-called an extension portion A, and a droplet 4 itself formed at an end of the portion A are reduced in resistance heating.

Thus, as shown in FIG. 1B, the inventors understood that in the vertical downward welding, a molten pool was moved from a back of arc to a position directly below the arc by gravity, that is, a deep molten pool was continuously formed directly below the arc, so that a barrier effect for relieving arc force was operated, thereby burn through was hard to occur (improvement in burn-through resistance). Moreover, it was known that even if undercut was momentarily produced, an effect of lowering the molten pool by gravity was significantly operated, and thus weld metal in the molten pool flew into the relevant undercut portion, therefore the undercut was eliminated during solidification (improvement in undercut resistance).

The reason for this is as follows. That is, viscosity and surface tension of the molten pool 6, which is formed in a region from the position directly below the arc 5 to the back of a weld, is decreased to reduce $P_1$, so that $P_2$ becomes relatively large, thereby the molten pool 6 is fallen into the position directly below the arc 5. The depth of the molten pool 6 $L_1$ directly below the arc 5 is thus increased to resist an effect of arc force, thereby depth of penetration $L_2$ is decreased.

As a result of earnest study, the inventors found that electric resistance of a solid wire itself was increased, so that resistance heating of the extension portion and the droplet itself was increased to increase temperature, and thus melt of the wire due to arc heat is decreased so that welding input heat was decreased, in addition, a composition of the solid wire was optimized, thereby viscosity and surface tension of the molten pool were significantly decreased so that an effect of gravity on the molten pool was sufficiently drawn, consequently the above mechanism was able to be achieved even in positions other than the vertical downward welding position.

During the study, it was known that when viscosity and surface tension of the molten pool was decreased by increasing oxygen by a previously known method such as increasing oxygen in gas components, or decreasing a strong deoxidization component such as Si or Mn contained as a component of the solid wire, difficulties frequently occurred, including production of a large amount of slag, generation of blow holes, degradation in bead shape, and increased amount of spatter.

Moreover, as an approach for overcoming such difficulties, the inventors found that slag and spatter were hardly produced due to a synergistic effect obtained by adding P and S in an appropriate amount respectively, and viscosity and surface tension of the molten pool was able to be extremely reduced while a bead shape was kept good.

FIG. 2 is a diagram for explaining appropriate content ranges of P and S, which were established for completing the solid wire of an embodiment of the invention; FIG. 3 is a diagram for explaining appropriate content ranges of O and N, which were established for completing the solid wire of an embodiment of the invention; and FIG. 4 is a diagram for explaining appropriate content ranges of O plus N and P, which were established for completing the solid wire of an embodiment of the invention.

Here, it is generally known that when each of P and S is contained at a high concentration, hot cracking tends to occur, and therefore, for example, JIS Z3312 specifies an upper limit of each of P and S to be 0.030 mass percent in order to prevent hot cracking.

As a result of study, the inventors found that P, which tends to significantly degrade crack resistance compared with S, was controlled to be 0.017 mass percent or less as shown in FIG. 2, O and N were strictly controlled to be 0.0050 mass percent or less respectively as shown in FIG. 3, and P, O and N were controlled to satisfy (content of P)*{(content of O)+ (content of N)}*$10^5 \leqq 15$ as a relationship between P, O and N, thereby even if P and S were contained at a high concentration respectively, hot cracking did not occur in one-pass welding (improvement in crack resistance).

According to such findings, the inventors completed the solid wire according to an embodiment of the invention preferable for arc welding.

The solid wire according to an embodiment of the invention, which was completed by the inventors, contains C of 0.020 to 0.100 mass percent, Si of 0.25 to 1.10 mass percent, Mn of 1.20 to 1.65 mass percent, P of 0.008 to 0.017 mass percent, S of 0.045 to 0.150 mass percent, O of not more than 0.0050 mass percent, and N of not more than 0.0050 mass percent, wherein (content of P)*{(content of O)+(content of N)}*$10^5 \leqq 15$ is satisfied, and the remainder including Fe and impurities.

Hereinafter, reasons for such numeric limitation in the solid wire according to an embodiment of the invention are described.

C: 0.020 to 0.100 Mass Percent

C has a deoxidization function, and exhibits an effect of improving strength of weld metal. Since multilayer welding is not performed in sheet welding, reduction in strength due to reheat need not be considered, and strength equal to or higher than that of a base metal can be obtained even in a small addition amount of C in steel sheets from a typically used, mild steel sheet in a class of 300 MPa or less to a high tensile steel sheet in a 590 MPa class.

However, when the content of C is decreased to less than 0.020 mass percent, strength of weld metal is decreased to a strength being able to be used only for mild steel, that is, weld metal becomes non-versatile. Therefore, C needs to be contained at 0.020 mass percent or more.

On the other hand, when the content of C is increased, crack resistance is significantly degraded as described before. Moreover, explosion of CO near arc causes increase in spatter, in addition, increase in fume. Furthermore, since deoxidization becomes excessive, oxygen in a molten pool is decreased, consequently viscosity and surface tension of the molten pool are increased. Therefore, the barrier effect for relieving arc force is reduced, and consequently burn-through resistance and undercut resistance tend to be degraded. Therefore, in additional consideration of securing crack resistance, C needs to be contained at 0.100 mass percent or less, and desirably contained at 0.070 mass percent or less.

Si: 0.25 to 1.10 Mass Percent

While Si is necessary for securing strength of weld metal, it has a function of increasing electric resistance of the solid wire. When Si is contained at less than 0.25 mass percent, strength of the weld metal is decreased to a strength being able to be used only for mild steel. Moreover, since electric resistance of the solid wire becomes excessively small, a current value per wire feed is increased. As a result, since input heat is increased, the burn-through resistance and the undercut resistance tend to be degraded. Therefore, Si needs to be contained at 0.25 mass percent or more.

On the other hand, when the content of Si exceeds 1.10 mass percent, deoxidization becomes excessive, thereby oxygen in the molten pool is decreased, and consequently viscosity and surface tension of the molten pool are increased. Therefore, the barrier effect for relieving arc force is reduced, and consequently the burn-through resistance and the undercut resistance tend to be degraded. When Si is excessive, weld metal is embrittled, consequently soundness of a welded part may be lost in hardness or the like. Therefore, Si needs to be contained at 1.10 mass percent or less, and is preferably contained at 0.75 mass percent or less.

Mn: 1.20 to 1.65 Mass Percent

Similarly, while Mn is necessary for securing strength of weld metal, it has a function of increasing electric resistance of the solid wire. When the content of Mn is less than 1.20 mass percent, strength of the weld metal is decreased to a strength being able to be used only for mild steel. Moreover, since electric resistance of the solid wire becomes excessively small, a current value per wire feed is increased. As a result, since input heat is increased, the burn-through resistance and the undercut resistance tend to be degraded. Moreover, when Mn is excessively small, weld metal is embrittled, consequently soundness of a welded part may be lost. Therefore, Mn needs to be contained at 1.20 mass percent or more.

On the other hand, when the content of Mn exceeds 1.65 mass percent, deoxidization becomes excessive, thereby oxygen in the molten pool is decreased, and consequently viscosity and surface tension of the molten pool are increased. Therefore, since weld metal in the molten pool hardly falls into a position directly below arc, the barrier effect for relieving arc force is reduced, and consequently the burn-through resistance and the undercut resistance tend to be degraded. Moreover, since a large amount of slag is produced, painting adaptability of a weld is degraded. Therefore, Mn needs to be contained at 1.65 mass percent or less, and is preferably contained at 1.55 mass percent or less.

P: 0.008 to 0.017 Mass Percent

P is the most important element with S in an embodiment of the invention, and has a function of reducing viscosity and surface tension of a molten pool. P is contained at an appropriate amount, so that even if arc precedes the molten pool, since the barrier effect for relieving arc force is easily obtained by the molten pool having low viscosity and low surface tension, high burn-through resistance and high undercut resistance can be achieved. P needs to be contained at 0.008 mass percent or more in order to obtain such an effect.

On the other hand, when the content of P exceeds 0.017 mass percent, a keeping limit of hot-cracking resistance may be broken even if content of each of other elements is appropriately adjusted, consequently when melting reaches to a back of a steel sheet, hot cracking tends to occur. Furthermore, viscosity of the molten pool is excessively reduced, thereby a bead tends to drop due to a gravity effect, so that the bead is hardly formed at an upper plate side in lap fillet welding, consequently the undercut tends to be induced (that is, the undercut resistance tends to be degraded). Therefore, P needs to be contained at 0.017 mass percent or less.

S: 0.045 to 0.150 Mass Percent

S is the most important element with P in an embodiment of the invention, and has a function of reducing viscosity and surface tension of the molten pool. S is contained at an appropriate amount, so that even if arc precedes the molten pool, since the barrier effect for relieving arc force is easily obtained by the molten pool having low viscosity and low surface tension, the burn-through resistance and the undercut resistance can be improved. S needs to be contained at 0.045 mass percent or more to obtain such an effect.

On the other hand, when the content of S exceeds 0.150 mass percent, not only surface tension of the molten pool, but also surface tension of a droplet formed at an end of the solid wire is significantly reduced, consequently the droplet cannot keep a spherical shape. In addition, since the molten pool is formed with an excessively large thickness, even if arc length is provided long, a short circuit condition is made, consequently spatter is extremely increased. Moreover, even if other elements are adjusted in content, improvement in crack resistance cannot be achieved, consequently when melting reaches to a back of a steel sheet, hot cracking significantly tends to be induced. Furthermore, viscosity of the molten pool is excessively decreased, thereby a bead tends to drop due to a gravity effect, so that the bead is hardly formed at an upper plate side in lap fillet welding, consequently the undercut resistance tends to be degraded. Furthermore, weld metal may be embrittled, leading to loss of soundness of a welded part. Therefore, S needs to be contained at 0.150 mass percent or less.

O: 0.0050 Mass Percent or Less

O is necessary for suppressing reduction in crack resistance due to adding P and S. When the content of O exceeds 0.0050 mass percent, the molten pool is increased in oxygen content, consequently inclusions are heavily produced, leading to cracking or production of a large amount of slag. Particularly when P and S are actively added, crack resistance needs to be seriously considered to be secured. In consideration of this, O needs to be limited further strictly.

When the content of O exceeds the 0.0050 mass percent, while the burn-through resistance is unproblematically reduced, viscosity of the molten pool is excessively reduced, and therefore a bead tends to drop due to a gravity effect, so that a bead is hardly formed at an upper plate side in lap fillet welding, consequently undercut resistance tends to be degraded. Moreover, when the content of O exceeds 0.0050 mass percent, since surface tension of a droplet is excessively reduced and thus the droplet tends to be shorted to the molten pool, large amount of spatter is produced along with short circuit and reignition of arc. Furthermore, inclusions are increased in the molten pool, causing embrittlement of weld metal. Therefore, O needs to be contained at 0.0500 mass percent or less.

N: 0.0050 Mass Percent or Less

N is necessary for suppressing reduction in crack resistance due to adding P and S. When the content of N exceeds 0.0050 mass percent, bonding strength of a crystal grain boundary is reduced, and inclusions are heavily produced, leading to cracking. Particularly when P and S are actively added, crack resistance needs to be seriously considered to be secured. In consideration of this, N needs to be strictly limited. Moreover, when the content of N exceeds 0.0050 mass percent, weld metal may be embrittled, consequently a welded part may lose soundness. Furthermore, when the content of N exceeds 0.0050 mass percent, viscosity of the molten pool is excessively reduced, and therefore a bead tends to drop due to a gravity effect, so that a bead is hardly formed at an upper plate side in a lap fillet welding, consequently undercut resistance tends to be degraded. Therefore, N needs to be contained at 0.0500 mass percent or less.

(Content of P)*{(Content of O)+(Content of N)}*$10^5 \leq 15$

Regarding P, O and N, it was found that content of each of the elements was needed to be individually specified as described before, in addition, the content was necessary to be further specified according to a predetermined relational expression depending on the individual content of the elements. It was found that that predetermined relational expression was able to be arranged as (content of P)*{(content of O)+(content of N)}*$10^5$, and when a value calculated from the expression was within a range of 15 or less, no problematic result was given. When the value calculated from such a relational expression exceeds 15, even if the content of P, O and N individually satisfies the requirement of an embodiment of the invention, cracking or undercut at an upper plate side may be induced. Therefore, regarding P, O and N, the content need to be individually controlled, in addition, the value calculated from (content of P)*{(content of O)+(content of N)}*$10^5$ needs to be controlled to be 15 or less.

The Remainder Including Fe and Impurities

The solid wire of an embodiment of the invention includes the above elements, in addition, Fe and impurities as the remainder.

As the impurities, preferably, Ti of 0.15 mass percent or less and B of 0.0050 mass percent or less are contained, in addition, Cr, Ni, Al, Nb, V, Zr, La and Ce are contained at 0.20 mass percent or less respectively.

Viscosity and surface tension of the molten pool are increased by containing Cr, Ni, Al, Ti, Nb, V, Zr, La or Ce. As a result, since molten metal in the molten pool hardly falls into a position directly below arc, the barrier effect for relieving arc force is reduced, consequently the burn-through resistance and the undercut resistance tend to be degraded, and furthermore a large amount of spatter is produced. Moreover, elements other than Ni among them are oxidized, therefore the elements cause a large amount of slag, leading to degradation in painting adaptability.

When B is contained at more than 0.0050 mass percent, the crack resistance tends to be significantly degraded.

Therefore, while the content of the impurities are desirably small to the utmost, they are allowed to be contained in the solid wire of an embodiment of the invention if they are within the above ranges. More preferably, the content of each of Ti, Cr and Ni is 0.05 mass percent or less, the content of each of Al, Nb, V, Zr, La and Ce is 0.01 mass percent or less, and the content of B is 0.0030 mass percent or less. Even if the impurities are actively added within the ranges, the impurities provide no advantages for an object of an embodiment of the invention, and may be categorized into an embodiment of the invention.

More desirably, the solid wire of an embodiment of the invention contains Mo at 0.30 mass percent or less.

Mo: 0.30 Mass Percent or Less

Mo can increase strength of weld metal. While a lower limit below which such an effect is not advantageous does not particularly exist, when Mo is contained at 0.05 mass percent or more, the effect can be conspicuously obtained.

On the other hand, when the content of Mo exceeds 0.30 mass percent, viscosity and surface tension of the molten pool are increased. As a result, since molten metal in the molten pool hardly falls to a position directly below arc, the barrier effect for relieving arc force is reduced, consequently the burn-through resistance and the undercut resistance tend to be degraded. In addition, a large amount of spatter is produced. Therefore, Mo is desirably contained at 0.30 mass percent or less.

Moreover, the solid wire of an embodiment of the invention desirably contains at least one of elements selected from K, Li, Na and Ca on a surface of the relevant solid wire so that the total content of K, Li, Na and Ca is 0.5 to 30 ppm. Furthermore, the solid wire of an embodiment of the invention more desirably contains $MoS_2$ of 0.01 to 1.00 g/10 kg on the surface of the relevant solid wire.

K, Li, Na and Ca: 0.005 to 0.300 g/10 kg in Total on a Surface of the Relevant Solid Wire While no problematic result is given even if K, Li, Na and Ca are not contained, these elements have a function of acting as an arc stabilizer in welding using Ar and an oxidizing gas ($O_2$, $CO_2$). When these elements exist near a surface of a droplet, electrons are easily emitted, which is effective for stabilizing arc. When arc is unstable, arc length is varied, in addition, arc force is varied. Since the burn-through resistance tends to be degraded thereby, arc is desirably stable to the utmost. Stabilization of arc can be achieved by coating or containing at least one of the elements acting as the arc stabilizer, and the effect can be conspicuously achieved by containing the elements at 0.005/10 kg (0.5 ppm in terms of weight) or more in total.

However, when the elements are contained at more than 0.300 g/10 kg (30 ppm in terms of weight) in total, the effect of stabilizing arc is saturated, in addition, lubricity of a surface of the solid wire may be rather degraded, resulting in reduction in feed stability. Therefore, 0.300 g/10 kg (30 ppm in terms of weight) is set to be an upper limit value from a practical viewpoint.

The content of the elements can be known in the following way: a solid wire in a certain weight (10 kg) is sampled, then calculation is made on difference between values of amount of K, Li, Na and Ca measured from total analysis, and values of them measured as amount of the elements in a non-surface or bulk remained after solving a surface by an acid or the like, and the amount of surface-existent substances obtained from the difference is defined as the content of the elements.

The elements are hardly added in ingoting. As a method of containing the elements in the surface of the solid wire by coating and the like, they can be contained near the surface through steps of (a) for example, using a drawing lubricant containing K, Li, Na and Ca such as potassium carbonate, lithium carbonate, sodium carbonate, and calcium carbonate during a wire drawing step to leave the elements on the surface of the solid wire; (b) for example, dipping the solid wire in a solution containing K, Li, Na and Ca, and then annealing the solid wire to diffuse the elements into grain boundaries or grains on the surface of the solid wire; (c) for example, performing copper plating to the solid wire using a potassium cyanide solution or sodium cyanide solution, and (d) for example, coating an oil containing ions of K, Li, Na and Ca as a feeding lubricant.

$MoS_2$ of 0.01 to 1.00 g/10 kg on the Surface of the Relevant Solid Wire

When $MoS_2$ exists on the surface of the solid wire, since momentary fusion at a current supply point is decreased, so that resistance is decreased, feed stability of the solid wire is improved. When the feed stability of the solid wire is unstable, arc length is also unstable, consequently arc force is varied. Since the burn-through resistance is easily degraded thereby, the feed stability of the solid wire is desirably stable to the utmost. When $MoS_2$ is coated, the burn-through resistance can be improved, and such an effect becomes advantageous by coating $MoS_2$ on the surface at 0.01 g (0.01 g/10 kg (1 ppm in terms of weight) or more per the solid wire of 10 kg.

On the other hand, even if $MoS_2$ is coated on the surface at more than 1.00 g/10 kg (100 ppm in terms of weight), $MoS_2$ tends to be deposited within a feed liner or current supply tip, leading to plugging, so that lubricity is rather degraded, consequently the feed stability may be reduced. Therefore, the content of $MoS_2$ coated (contained) on (in) the surface of the solid wire is desirably 1.00 g/10 kg or less.

As a method of coating $MoS_2$ on the solid wire, there is a method of mixing $MoS_2$ into the drawing lubricant in the wire drawing step, and leaving it to a final diameter stage, or a method of mixing $MoS_2$ into a lubricant to be coated at a finish diameter stage.

The solid wire of an embodiment of the invention may be covered with copper plating.

Copper Plating

In a typical solid wire, a surface of a wire is covered with copper plating, thereby improvement in stain resistance, keeping of wear resistance of a current supply tip, and an effect of improving wire-drawability in production of the solid wire and improvement in productivity due to the effect, and reduction in cost can be achieved.

When the surface of the wire is not covered with copper plating, electric resistance at a current supply portion is increased. A heating effect at that time increases temperature when the solid wire reaches to an arc generation point, consequently the solid wire is into an easily meltable state. Since a welding source provides a current sufficient to melt a fed solid wire, the current is reduced in the solid wire in the meltable state, and if the melting amount is constant, input heat can be decreased. Therefore, depth of penetration can be further decreased, so that arc force can be also reduced. Thus, the undercut resistance can be improved.

The solid wire according to an embodiment of the invention can be manufactured according to a usual method. For example, ingot steel having the above composition is ingoted using a converter, an electric furnace and the like, the obtained ingot steel is subjected to a continuous casting method or an ingot casting method to manufacture a steel material (such as billet), then the manufactured steel material is heated and then subjected to hot rolling (extrusion rolling), and furthermore subjected to dry, cold rolling (cold drawing), so that a source rod for a welding wire, for example, 5.5 mm in diameter (sometimes called steel wire) is manufactured, and then the welding wire is subjected to annealing and pickling as needed for drawing, and consequently a solid wire having a final wire diameter (for example, 1.2 mm in diameter) can be manufactured.

In drawing, surface treatment can be performed according to various methods depending on necessity. As the methods, (1) a copper plating treatment may be performed in a wet process, (2) K, Li, Na and Ca may be added into a copper plating bath in the copper plating treatment so that the elements are added as elements in a copper plating layer, (3) a drawing lubricant containing K, Li, Na, Ca and $MoS_2$ may be used so that an appropriate amount of each of them is remained, (4) a wire rod may be dipped in a solution containing K, Li, Na and Ca, then subjected to annealing so that K, Li, Na and Ca are diffused into grain boundaries or grains near a surface, (5) grease may be coated for feed lubrication and rust prevention, and (6) K, Li, Na, Ca and $MoS_2$ may be solved or dispersed in the grease so that they are remained on a surface of the relevant solid wire. The surface treatment that can be performed to the solid wire of an embodiment of the invention is not limitedly performed according to the above methods, and may be performed according to the other methods. In addition, even if surface treatment is performed according to any optional method, if a resultantly obtained solid wire is within a scope of an embodiment of the invention, the same advantages are exhibited during and after welding.

EXAMPLES

Next, regarding the solid wire of an embodiment of the invention, examples that satisfy requirements of an embodiment of the invention and comparative examples that do not satisfy the requirements of an embodiment of the invention are described in detail in contrast with each other.

Ingot steel having each of compositions shown in Tables 1 to 3 was ingoted by an electric furnace, then the ingot steel was subjected to extrusion rolling and cold drawing so that a welding wire 5.5 mm in diameter was manufactured, and then the welding wire was drawn into a wire having a diameter of 2.4 mm, and the drawn wire was subjected to intermediate annealing and copper plating treatment as necessary for intermediate drawing, and furthermore subjected to finish drawing, and then the drawn wire was subjected to skin-pass and coated with lubricating oil, and consequently a solid wire having a final wire diameter of 1.2 mm was manufactured. K, Li, Na and Ca were contained in a solid lubricant used for cold drawing, and left as necessary. $MoS_2$ was dispersed in the lubricating oil, and left as necessary. O was controlled by adjusting conditions of temperature, time, and atmospheric gas during annealing.

Solid wires of No. 1 to 100 manufactured in this way were evaluated in respective evaluation items of (1) burn-through resistance, (2) undercut resistance, (3) hardness of weld metal, (4) crack resistance, (5) spatter production, (6) feed stability, (7) an encapsulation ratio of slag, and (8) Charpy absorbed energy. Evaluation methods of the evaluation items of (1) to (8) are as follow.

TABLE 1

| No. | C | Si | Mn | P | S | Cr | Ni | Al | Ti | Nb | V | Zr | La | Ce | B | N | O |
|---|---|---|---|---|---|---|---|---|---|---|---|---|---|---|---|---|---|
| 1 | 0.035 | 0.80 | 1.40 | 0.010 | 0.120 | — | — | — | — | — | — | — | — | — | — | 0.0047 | 0.0045 |
| 2 | 0.035 | 0.80 | 1.40 | 0.010 | 0.120 | — | — | — | — | — | — | — | — | — | — | 0.0047 | 0.0045 |
| 3 | 0.065 | 0.50 | 1.50 | 0.015 | 0.060 | — | — | — | — | — | — | — | — | — | — | 0.0030 | 0.0020 |
| 4 | 0.065 | 0.50 | 1.50 | 0.015 | 0.060 | — | — | — | — | — | — | — | — | — | — | 0.0030 | 0.0020 |
| 5 | 0.035 | 0.80 | 1.40 | 0.010 | 0.120 | — | — | — | — | — | — | — | — | — | — | 0.0047 | 0.0045 |
| 6 | 0.035 | 0.80 | 1.40 | 0.010 | 0.120 | — | — | — | — | — | — | — | — | — | — | 0.0047 | 0.0045 |
| 7 | 0.065 | 0.50 | 1.50 | 0.015 | 0.060 | — | — | — | — | — | — | — | — | — | — | 0.0030 | 0.0020 |
| 8 | 0.065 | 0.50 | 1.50 | 0.015 | 0.060 | — | — | — | — | — | — | — | — | — | — | 0.0030 | 0.0020 |
| 9 | 0.035 | 0.80 | 1.40 | 0.010 | 0.120 | — | — | — | — | — | — | — | — | — | — | 0.0047 | 0.0045 |
| 10 | 0.035 | 0.80 | 1.40 | 0.010 | 0.120 | — | — | — | — | — | — | — | — | — | — | 0.0047 | 0.0045 |
| 11 | 0.065 | 0.60 | 1.50 | 0.015 | 0.060 | — | — | — | — | — | — | — | — | — | — | 0.0030 | 0.0020 |
| 12 | 0.065 | 0.50 | 1.50 | 0.015 | 0.060 | — | — | — | — | — | — | — | — | — | — | 0.0030 | 0.0020 |
| 13 | 0.035 | 0.80 | 1.40 | 0.010 | 0.120 | — | — | — | — | — | — | — | — | — | — | 0.0047 | 0.0045 |
| 14 | 0.035 | 0.80 | 1.40 | 0.010 | 0.120 | — | — | — | — | — | — | — | — | — | — | 0.0047 | 0.0045 |
| 15 | 0.065 | 0.50 | 1.50 | 0.015 | 0.060 | — | — | — | — | — | — | — | — | — | — | 0.0030 | 0.0020 |
| 16 | 0.065 | 0.50 | 1.50 | 0.015 | 0.060 | — | — | — | — | — | — | — | — | — | — | 0.0030 | 0.0020 |
| 17 | 0.035 | 0.80 | 1.40 | 0.010 | 0.120 | — | — | — | — | — | — | — | — | — | — | 0.0047 | 0.0045 |
| 18 | 0.035 | 0.80 | 1.40 | 0.010 | 0.120 | — | — | — | — | — | — | — | — | — | — | 0.0047 | 0.0045 |
| 19 | 0.065 | 0.50 | 1.50 | 0.015 | 0.060 | — | — | — | — | — | — | — | — | — | — | 0.0030 | 0.0020 |
| 20 | 0.065 | 0.50 | 1.50 | 0.015 | 0.060 | — | — | — | — | — | — | — | — | — | — | 0.0030 | 0.0020 |
| 21 | 0.035 | 0.80 | 1.40 | 0.010 | 0.120 | — | — | — | — | — | — | — | — | — | — | 0.0047 | 0.0045 |
| 22 | 0.035 | 0.80 | 1.40 | 0.010 | 0.120 | — | — | — | — | — | — | — | — | — | — | 0.0047 | 0.0045 |
| 23 | 0.065 | 0.50 | 1.50 | 0.015 | 0.060 | — | — | — | — | — | — | — | — | — | — | 0.0030 | 0.0020 |
| 24 | 0.065 | 0.50 | 1.50 | 0.015 | 0.060 | — | — | — | — | — | — | — | — | — | — | 0.0030 | 0.0020 |
| 25 | 0.035 | 0.80 | 1.40 | 0.010 | 0.120 | — | — | — | — | — | — | — | — | — | — | 0.0047 | 0.0045 |
| 26 | 0.035 | 0.80 | 1.40 | 0.010 | 0.120 | — | — | — | — | — | — | — | — | — | — | 0.0047 | 0.0045 |

TABLE 1-continued

| | | | | | | | | | | | | | | | | | |
|---|---|---|---|---|---|---|---|---|---|---|---|---|---|---|---|---|---|
| 27 | 0.065 | 0.50 | 1.50 | 0.015 | 0.060 | — | — | — | — | — | — | — | — | — | — | 0.0030 | 0.0020 |
| 28 | 0.065 | 0.50 | 1.50 | 0.015 | 0.060 | — | — | — | — | — | — | — | — | — | — | 0.0030 | 0.0020 |
| 29 | 0.035 | 0.80 | 1.40 | 0.010 | 0.120 | — | — | — | — | — | — | — | — | — | — | 0.0047 | 0.0045 |
| 30 | 0.035 | 0.80 | 1.40 | 0.010 | 0.120 | — | — | — | — | — | — | — | — | — | — | 0.0047 | 0.0045 |
| 31 | 0.065 | 0.50 | 1.50 | 0.015 | 0.060 | — | — | — | — | — | — | — | — | — | — | 0.0030 | 0.0020 |
| 32 | 0.065 | 0.50 | 1.50 | 0.015 | 0.060 | — | — | — | — | — | — | — | — | — | — | 0.0030 | 0.0020 |
| 33 | 0.045 | 0.75 | 1.40 | 0.008 | 0.080 | — | — | — | — | — | — | — | — | — | — | 0.0030 | 0.0040 |

| No. | Value calculated from predetermined relational expression between P, O and N | Mo | Content of K, Na, Li and Ca in surface | Content of $MoS_2$ in surface | Cu Plating |
|---|---|---|---|---|---|
| 1 | 9.2 | — | — | — | performed |
| 2 | 9.2 | 0.15 | — | — | performed |
| 3 | 7.5 | — | — | — | performed |
| 4 | 7.5 | 0.15 | — | — | performed |
| 5 | 9.2 | — | K: 5 | — | performed |
| 6 | 9.2 | 0.15 | K: 5 | — | performed |
| 7 | 7.5 | — | K: 5 | — | performed |
| 8 | 7.5 | 0.15 | K: 5 | — | performed |
| 9 | 9.2 | — | — | 0.10 | performed |
| 10 | 9.2 | 0.15 | — | 0.10 | performed |
| 11 | 7.5 | — | — | 0.10 | performed |
| 12 | 7.5 | 0.15 | — | 0.10 | performed |
| 13 | 9.2 | — | K: 5 | 0.10 | performed |
| 14 | 9.2 | 0.15 | K: 5 | 0.10 | performed |
| 15 | 7.5 | — | K: 5 | 0.10 | performed |
| 16 | 7.5 | 0.15 | K: 5 | 0.10 | performed |
| 17 | 9.2 | — | — | — | not performed |
| 18 | 9.2 | 0.15 | — | — | not performed |
| 19 | 7.5 | — | — | — | not performed |
| 20 | 7.5 | 0.15 | — | — | not performed |
| 21 | 9.2 | — | K: 5 | — | not performed |
| 22 | 9.2 | 0.15 | K: 5 | — | not performed |
| 23 | 7.5 | — | K: 5 | — | not performed |
| 24 | 7.5 | 0.15 | K: 5 | — | not performed |
| 25 | 9.2 | — | — | 0.10 | not performed |
| 26 | 9.2 | 0.15 | — | 0.10 | not performed |
| 27 | 7.5 | — | — | 0.10 | not performed |
| 28 | 7.5 | 0.15 | — | 0.10 | not performed |
| 29 | 9.2 | — | K: 5 | 0.10 | not performed |
| 30 | 9.2 | 0.15 | K: 5 | 0.10 | not performed |
| 31 | 7.5 | — | K: 5 | 0.10 | not performed |
| 32 | 7.5 | 0.15 | K: 5 | 0.10 | not performed |
| 33 | 5.6 | — | — | — | performed |

TABLE 2

| No. | C | Si | Mn | P | S | Cr | Ni | Al | Ti | Nb | V | Zr | La | Ce | B |
|---|---|---|---|---|---|---|---|---|---|---|---|---|---|---|---|
| 34 | 0.030 | 0.40 | 1.30 | 0.010 | 0.100 | — | — | — | — | — | — | — | — | — | — |
| 35 | 0.060 | 0.90 | 1.62 | 0.011 | 0.140 | — | — | — | — | — | — | — | — | — | — |
| 36 | 0.060 | 0.90 | 1.62 | 0.011 | 0.140 | — | — | — | — | — | — | — | — | — | — |
| 37 | 0.020 | 0.28 | 1.20 | 0.008 | 0.080 | — | — | — | — | — | — | — | — | — | — |
| 38 | 0.100 | 1.00 | 1.30 | 0.014 | 0.046 | 0.20 | — | — | — | — | — | — | — | — | — |
| 39 | 0.050 | 0.80 | 1.65 | 0.010 | 0.073 | — | 0.20 | 0.20 | — | — | — | — | — | — | — |
| 40 | 0.021 | 0.80 | 1.55 | 0.016 | 0.090 | 0.02 | — | — | 0.12 | — | — | — | — | — | — |
| 41 | 0.040 | 0.50 | 1.35 | 0.009 | 0.060 | — | — | — | — | 0.20 | — | — | — | — | — |
| 42 | 0.089 | 0.38 | 1.60 | 0.010 | 0.065 | — | — | — | 0.005 | — | — | — | — | — | 0.0050 |
| 43 | 0.035 | 0.75 | 1.25 | 0.008 | 0.060 | — | — | — | — | — | 0.20 | — | — | — | 0.0005 |
| 44 | 0.040 | 0.95 | 1.40 | 0.012 | 0.145 | — | 0.02 | — | — | — | — | 0.20 | — | — | — |
| 45 | 0.068 | 0.80 | 1.25 | 0.009 | 0.050 | — | — | — | — | — | — | — | 0.15 | 0.15 | — |
| 46 | 0.099 | 1.10 | 1.35 | 0.014 | 0.046 | 0.05 | — | — | — | — | — | — | — | — | — |
| 47 | 0.050 | 0.99 | 1.65 | 0.012 | 0.073 | — | 0.05 | 0.008 | — | — | — | — | — | — | — |
| 48 | 0.025 | 0.80 | 1.55 | 0.017 | 0.120 | 0.02 | — | — | 0.015 | — | — | — | — | — | — |
| 49 | 0.040 | 0.70 | 1.35 | 0.010 | 0.060 | — | — | — | — | 0.008 | — | — | — | — | — |
| 50 | 0.075 | 0.48 | 1.60 | 0.010 | 0.065 | — | — | — | 0.005 | — | — | — | — | — | 0.0028 |
| 51 | 0.035 | 0.75 | 1.30 | 0.010 | 0.080 | — | — | — | — | — | 0.008 | — | — | — | 0.0005 |
| 52 | 0.040 | 1.00 | 1.40 | 0.009 | 0.100 | — | 0.02 | — | — | — | — | 0.008 | — | — | — |
| 53 | 0.050 | 0.80 | 1.25 | 0.011 | 0.050 | — | — | — | — | — | — | — | 0.007 | 0.007 | — |
| 54 | 0.030 | 0.80 | 1.40 | 0.010 | 0.070 | 0.04 | 0.04 | 0.007 | 0.050 | 0.008 | 0.005 | 0.008 | 0.005 | 0.005 | 0.0025 |
| 55 | 0.050 | 0.95 | 1.63 | 0.016 | 0.085 | — | — | — | — | — | — | — | — | — | — |
| 56 | 0.050 | 0.95 | 1.63 | 0.016 | 0.085 | — | — | — | — | — | — | — | — | — | — |
| 57 | 0.080 | 0.40 | 1.20 | 0.010 | 0.057 | — | — | — | — | — | — | — | — | — | — |
| 58 | 0.080 | 0.95 | 1.20 | 0.010 | 0.057 | — | — | — | — | — | — | — | — | — | — |
| 59 | 0.080 | 0.95 | 1.20 | 0.010 | 0.057 | — | — | — | 0.050 | — | — | — | — | — | — |

TABLE 2-continued

| No. | C | Si | Mn | P | S | Cr | Ni | Al | Ti | Nb | V | Zr | La | Ce | B |
|---|---|---|---|---|---|---|---|---|---|---|---|---|---|---|---|
| 60 | 0.080 | 0.40 | 1.63 | 0.012 | 0.070 | — | — | — | — | — | — | — | — | — | — |
| 61 | 0.035 | 0.80 | 1.40 | 0.010 | 0.060 | — | — | — | — | — | — | — | — | — | — |
| 62 | 0.035 | 0.80 | 1.40 | 0.010 | 0.060 | — | — | — | — | — | — | — | — | — | — |
| 63 | 0.035 | 0.80 | 1.40 | 0.010 | 0.060 | — | — | — | — | — | — | — | — | — | — |
| 64 | 0.050 | 0.65 | 1.63 | 0.015 | 0.047 | 0.02 | 0.02 | 0.003 | 0.009 | 0.008 | 0.005 | 0.008 | 0.001 | 0.001 | 0.0006 |
| 65 | 0.014 | 0.80 | 1.40 | 0.010 | 0.060 | — | — | — | — | — | — | — | — | — | — |
| 66 | 0.110 | 0.80 | 1.40 | 0.010 | 0.050 | — | — | — | — | — | — | — | — | — | — |

| No. | N | O | Value calculated from predetermined relational expression between P, O and N | Mo | Content of K, Na, Li and Ca in surface | Content of MoS$_2$ in surface | Cu Plating |
|---|---|---|---|---|---|---|---|
| 34 | 0.0030 | 0.0040 | 7.0 | — | — | — | performed |
| 35 | 0.0030 | 0.0040 | 7.7 | — | K: 5 | — | performed |
| 36 | 0.0030 | 0.0040 | 7.7 | — | K: 5 | 0.10 | not performed |
| 37 | 0.0015 | 0.0015 | 2.4 | — | Na: 5 | — | performed |
| 38 | 0.0040 | 0.0033 | 10.2 | 0.05 | — | — | performed |
| 39 | 0.0042 | 0.0050 | 9.2 | 0.10 | Ca: 2, Na: 1 | 0.01 | performed |
| 40 | 0.0050 | 0.0043 | 14.9 | — | Li: 5 | 0.90 | performed |
| 41 | 0.0035 | 0.0045 | 7.2 | 0.29 | — | 0.50 | not performed |
| 42 | 0.0020 | 0.0020 | 4.0 | — | K; 10 Na: 10 Li: 10 | — | performed |
| 43 | 0.0034 | 0.0035 | 5.5 | 0.20 | K: 0.5 | — | performed |
| 44 | 0.0025 | 0.0044 | 8.3 | 0.01 | Na: 05 | 0.05 | not performed |
| 45 | 0.0020 | 0.0040 | 5.4 | — | — | — | performed |
| 46 | 0.0040 | 0.0040 | 11.2 | 0.05 | — | — | performed |
| 47 | 0.0010 | 0.0044 | 6.5 | 0.10 | Ca: 2, Na: 1 | 0.01 | performed |
| 48 | 0.0030 | 0.0049 | 13.4 | — | Li: 5 | 0.90 | performed |
| 49 | 0.0025 | 0.0020 | 4.5 | 0.29 | — | 0.50 | not performed |
| 50 | 0.0035 | 0.0035 | 7.0 | — | K; 10 Na: 10 Li: 10 | — | performed |
| 51 | 0.0045 | 0.0035 | 8.0 | 0.20 | K: 0.5 | — | performed |
| 52 | 0.0040 | 0.0030 | 6.3 | 0.01 | Na: 0.5 | 0.05 | not performed |
| 53 | 0.0020 | 0.0025 | 5.0 | — | — | — | performed |
| 54 | 0.0035 | 0.0035 | 7.0 | — | — | — | performed |
| 55 | 0.0044 | 0.0040 | 13.4 | — | K: 24 | — | performed |
| 56 | 0.0044 | 0.0040 | 13.4 | — | K: 2 | 0.05 | not performed |
| 57 | 0.0040 | 0.0040 | 8.0 | — | — | — | performed |
| 58 | 0.0040 | 0.0040 | 8.0 | — | — | — | performed |
| 59 | 0.0040 | 0.0040 | 8.0 | — | — | — | performed |
| 60 | 0.0040 | 0.0040 | 9.6 | — | — | — | performed |
| 61 | 0.0025 | 0.0030 | 5.5 | — | K: 32 | 0.10 | performed |
| 62 | 0.0025 | 0.0030 | 5.5 | — | Ca: 5, Na: 20, K: 7 | 0.10 | performed |
| 63 | 0.0025 | 0.0030 | 5.5 | — | K: 5 | 1.10 | not performed |
| 64 | 0.0025 | 0.0030 | 8.3 | 0.15 | — | 1.10 | performed |
| 65 | 0.0025 | 0.0045 | 7.0 | — | K: 5 | 0.10 | performed |
| 66 | 0.0025 | 0.0045 | 7.0 | — | K: 5 | 0.10 | performed |

TABLE 3

| No. | C | Si | Mn | P | S | Cr | Ni | Al | Ti | Nb | V | Zr | La | Ce | B |
|---|---|---|---|---|---|---|---|---|---|---|---|---|---|---|---|
| 67 | 0.035 | 0.23 | 1.20 | 0.010 | 0.060 | — | — | — | — | — | — | — | — | — | — |
| 68 | 0.035 | 1.15 | 1.55 | 0.010 | 0.060 | — | — | — | — | — | — | — | — | — | — |
| 69 | 0.035 | 0.62 | 1.17 | 0.010 | 0.060 | — | — | — | — | — | — | — | — | — | — |
| 70 | 0.030 | 0.75 | 0.95 | 0.013 | 0.095 | — | — | 0.002 | — | — | — | — | — | — | — |
| 71 | 0.040 | 0.90 | 1.67 | 0.008 | 0.060 | — | — | — | — | — | — | — | — | — | — |
| 72 | 0.040 | 0.95 | 1.80 | 0.014 | 0.100 | — | — | 0.003 | — | — | — | — | — | — | — |
| 73 | 0.020 | 0.80 | 1.40 | 0.018 | 0.060 | — | — | — | — | — | — | — | — | — | — |
| 74 | 0.020 | 0.85 | 1.35 | 0.040 | 0.050 | — | — | 0.003 | — | — | — | — | — | — | — |
| 75 | 0.035 | 0.80 | 1.40 | 0.010 | 0.043 | — | — | — | — | — | — | — | — | — | — |
| 76 | 0.035 | 0.80 | 1.40 | 0.010 | 0.155 | — | — | — | — | — | — | — | — | — | — |
| 77 | 0.120 | 1.15 | 1.50 | 0.012 | 0.180 | — | — | 0.004 | — | — | — | — | — | — | — |
| 78 | 0.050 | 0.80 | 1.40 | 0.017 | 0.060 | — | — | — | — | — | — | — | — | — | — |
| 79 | 0.040 | 0.80 | 1.40 | 0.016 | 0.100 | 0.02 | 0.02 | — | 0.005 | — | — | — | — | — | — |
| 80 | 0.060 | 0.40 | 1.25 | 0.016 | 0.050 | — | — | 0.007 | — | — | — | 0.007 | — | — | — |
| 81 | 0.035 | 0.80 | 1.40 | 0.010 | 0.060 | 0.21 | — | — | — | — | — | — | — | — | — |
| 82 | 0.035 | 0.80 | 1.40 | 0.010 | 0.060 | — | 0.21 | — | — | — | — | — | — | — | — |
| 83 | 0.035 | 0.80 | 1.40 | 0.010 | 0.060 | — | — | 0.21 | — | — | — | — | — | — | — |
| 84 | 0.035 | 0.80 | 1.40 | 0.010 | 0.060 | — | — | — | 0.16 | — | — | — | — | — | — |
| 85 | 0.035 | 0.80 | 1.40 | 0.010 | 0.060 | — | — | — | — | 0.21 | — | — | — | — | — |
| 86 | 0.035 | 0.80 | 1.40 | 0.010 | 0.060 | — | — | — | — | — | 0.21 | — | — | — | — |
| 87 | 0.035 | 0.80 | 1.40 | 0.010 | 0.060 | — | — | — | — | — | — | 0.21 | — | — | — |
| 88 | 0.035 | 0.80 | 1.40 | 0.010 | 0.060 | — | — | — | — | — | — | — | 0.21 | — | — |
| 89 | 0.035 | 0.80 | 1.40 | 0.010 | 0.060 | — | — | — | — | — | — | — | — | 0.21 | — |
| 90 | 0.035 | 0.80 | 1.40 | 0.010 | 0.060 | — | — | — | — | — | — | — | — | — | 0.0055 |
| 91 | 0.035 | 0.80 | 1.40 | 0.010 | 0.060 | — | — | — | — | — | — | — | — | — | — |
| 92 | 0.035 | 0.80 | 1.40 | 0.010 | 0.060 | — | — | — | — | — | — | — | — | — | — |

TABLE 3-continued

| 93 | 0.035 | 0.80 | 1.40 | 0.012 | 0.110 | — | — | — | — | — | — | — | — | — | — |
| 94 | 0.035 | 0.80 | 1.40 | 0.010 | 0.060 | — | — | — | — | — | — | — | — | — | — |
| 95 | 0.050 | 0.20 | 1.25 | 0.022 | 0.018 | — | — | — | 0.08 | — | — | — | — | — | — |
| 96 | 0.110 | 0.75 | 1.85 | 0.010 | 0.002 | 0.20 | — | — | 0.012 | 0.15 | — | — | — | — | — | 0.0060 |
| 97 | 0.060 | 0.90 | 1.45 | 0.010 | 0.075 | — | — | 0.002 | — | — | — | — | — | — | — |
| 98 | 0.070 | 0.65 | 1.50 | 0.006 | 0.057 | — | — | 0.005 | — | — | — | — | — | — | — |
| 99 | 0.030 | 0.45 | 1.35 | 0.007 | 0.120 | — | — | — | — | — | — | — | — | — | — |
| 100 | 0.090 | 1.00 | 1.35 | 0.005 | 0.035 | 0.01 | — | — | — | — | — | — | — | — | — |

| No. | N | O | Value calculated from predetermined relational expression between P, O and N | Mo | Content of K, Na, Li and Ca in surface | Content of $MoS_2$ in surface | Cu plating |
|---|---|---|---|---|---|---|---|
| 67 | 0.0025 | 0.0045 | 7.0 | — | K: 5 | 0.10 | performed |
| 68 | 0.0025 | 0.0045 | 7.0 | — | K: 5 | 0.10 | performed |
| 69 | 0.0025 | 0.0045 | 7.0 | — | K: 5 | 0.10 | performed |
| 70 | 0.0020 | 0.0030 | 6.5 | — | — | — | performed |
| 71 | 0.0025 | 0.0045 | 5.6 | — | K: 5 | 0.10 | performed |
| 72 | 0.0070 | 0.0035 | 14.7 | — | — | — | performed |
| 73 | 0.0025 | 0.0045 | 12.6 | — | K: 5 | 0.10 | performed |
| 74 | 0.0040 | 0.0035 | 30.0 | — | — | — | performed |
| 75 | 0.0045 | 0.0025 | 7.0 | — | K: 5 | 0.10 | performed |
| 76 | 0.0025 | 0.0040 | 6.5 | — | K: 5 | 0.10 | performed |
| 77 | 0.0040 | 0.0030 | 8.4 | — | — | — | performed |
| 78 | 0.0045 | 0.0045 | 15.3 | — | K: 5 | 0.10 | performed |
| 79 | 0.0050 | 0.0049 | 15.8 | — | — | — | not performed |
| 80 | 0.0045 | 0.0050 | 15.2 | 0.25 | Li: 0.9 | 0.50 | performed |
| 81 | 0.0025 | 0.0045 | 7.0 | — | K: 5 | 0.10 | performed |
| 82 | 0.0025 | 0.0045 | 7.0 | — | K: 5 | 0.10 | performed |
| 83 | 0.0025 | 0.0045 | 7.0 | — | K: 5 | 0.10 | performed |
| 84 | 0.0025 | 0.0045 | 7.0 | — | K: 5 | 0.10 | performed |
| 85 | 0.0025 | 0.0045 | 7.0 | — | K: 5 | 0.10 | performed |
| 86 | 0.0025 | 0.0045 | 7.0 | — | K: 5 | 0.10 | performed |
| 87 | 0.0025 | 0.0045 | 7.0 | — | K: 5 | 0.10 | performed |
| 88 | 0.0025 | 0.0045 | 7.0 | — | K: 5 | 0.10 | performed |
| 89 | 0.0025 | 0.0045 | 7.0 | — | K: 5 | 0.10 | performed |
| 90 | 0.0025 | 0.0045 | 7.0 | — | K: 5 | 0.10 | performed |
| 91 | 0.0060 | 0.0025 | 8.5 | — | K: 5 | 0.10 | performed |
| 92 | 0.0045 | 0.0060 | 10.5 | — | K: 5 | 0.10 | performed |
| 93 | 0.0030 | 0.0065 | 11.4 | — | — | — | not performed |
| 94 | 0.0025 | 0.0045 | 7.0 | 0.35 | K: 5 | 0.10 | performed |
| 95 | 0.0050 | 0.0020 | 15.4 | — | — | — | performed |
| 96 | 0.0020 | 0.0020 | 4.0 | 0.32 | — | — | performed |
| 97 | 0.0060 | 0.0060 | 12 | — | — | — | performed |
| 98 | 0.0040 | 0.0080 | 7.2 | — | — | — | performed |
| 99 | 0.0030 | 0.0030 | 4.2 | — | — | — | not performed |
| 100 | 0.0030 | 0.0030 | 3 | — | K: 5 | 0.10 | not performed |

(1) Burn-through Resistance

Figure 5:
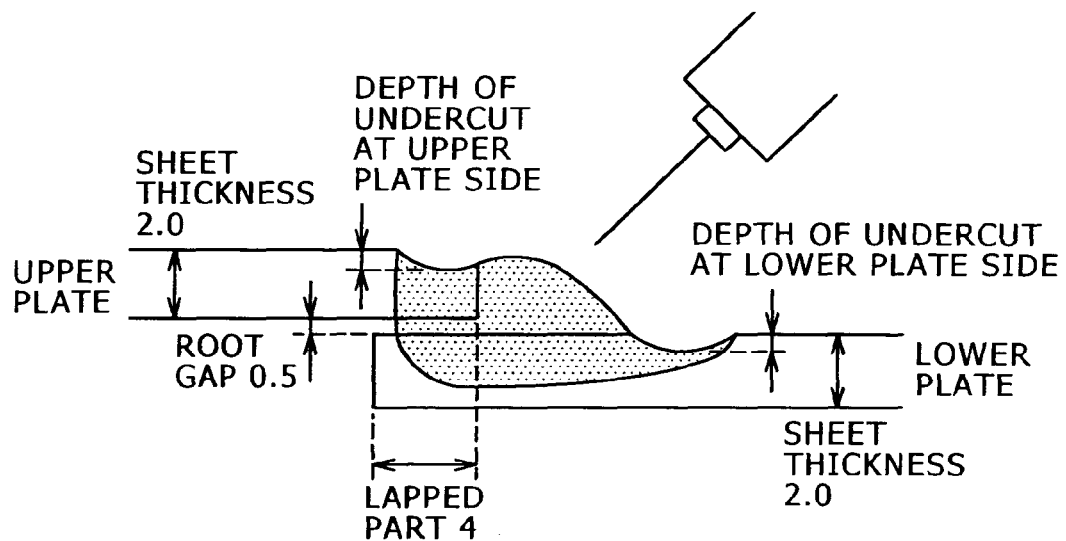
FIG. 5 is a diagram for explaining a lap fillet welding test, and explaining definition of depth of undercut.

FIG. 5 is a diagram for explaining a lap fillet welding test, and explaining definition of depth of undercut.

As shown in FIG. 5, carbon steel sheets 2.0 mm in thickness and 520 MPa in tensile strength were set into a lap joint with a root gap of 0.5 mm and a lapped part of 4 mm, then subjected to lap welding at welding speed of 80 cm/min in a horizontal position. At that time, a composition of shielding gas was Ar of 80% and $CO_2$ of 20%, polarity was minus at base metal, and extension of the solid wire was 15 mm. A current was changed by 5 A, and a feed rate of the solid wire at a maximum value of a current at which the burn through did not occur was assumed as a critical feed rate (m/min) and used for evaluation of the burn-through resistance. Here, the reason why the burn-through resistance was not evaluated using a current value is that a relationship between the current value and the feed rate is changed depending on a composition of the solid wire. A voltage value was adjusted every time the current value was changed so that a value at which arc was determined to be most stable (optimally determinate value) was used. According to this, when the deposited amount is constant, penetration becomes shallower as the critical feed rate is increased, therefore excellent burn-through resistance is given.

In evaluation of the burn-through resistance, a sample with a critical feed rate of 5.60 m/min or more and less than 6.50 m/min was evaluated to be good (a circle), and a sample with a critical feed rate of 6.50 m/min or more was evaluated to be excellent (a double circle). On the contrary, a sample with a critical feed rate of less than 5.60 m/min was evaluated to be not-good (a cross). It was determined that the sample being good (a circle) and the sample being excellent (a double circle) were acceptable, and the sample being not-good (a cross) was rejectable.

(2) Undercut Resistance

Receiving results of the test (1), when welding was performed in setting of a current value of ((current value at the critical feed rate) minus 30 A), and a voltage value of ((optimally determinate value) plus 2 V), a sectional macro photograph (magnification of ×10) of a bead was taken, and depth of undercut in a welding toe portion was measured from such a sectional macro photograph (which is shown as "depth of undercut (mm)" in Tables 4 to 6). As shown in FIG. 5, both of depth at an upper plate side and depth at a lower plate side were measured, and a maximum value of the depth was determined as an evaluated value.

In evaluation of the undercut resistance, a sample with the maximum value of more than 0.30 mm and 0.50 mm or less was evaluated to be good (a circle), and a sample with the maximum value of 0.30 mm or less was evaluated to be excellent (a double circle). On the contrary, a sample with the maximum value of more than 0.50 mm was evaluated to be not-good (a cross). It was determined that the sample being good (a circle) and the sample being excellent (a double circle) were acceptable, and the sample being not-good (a cross) was rejectable.

(3) Hardness of Weld Metal

Receiving the results of the test (1), when welding was performed in setting of a current value of ((current value at the critical feed rate) minus 10 A), Vickers hardness (load 1 kgf (1N)) of a sectionally central portion of weld metal of a lap joint was measured at three points, and an average value of them was determined as strength (HV) of the weld metal.

In evaluation of the hardness of weld metal, a sample with Vickers hardness of 160 HV or more was evaluated to be good (a circle) on general view that hardness equal to or higher than that of base metal is good, and a sample with Vickers hardness of less than 160 HV was evaluated to be not-good (a cross). It was determined that the sample being good (a circle) was acceptable, and the sample being not-good (a cross) was rejectable.

(4) Crack Resistance

Receiving the results of the test (1), welding was performed ten times in welding length of 100 mm with the current value at the critical feed rate and at the critical feed rate, and all welds were subjected to an X-ray transmission test. Results are shown as "Cracks" in Tables 4 to 6.

In evaluation of the crack resistance, a sample being sound with cracks being not found was evaluated as "not found" (good), and a sample with cracks being found was evaluated as "found" (not-good). It was determined that the sample being good was acceptable, and the sample being not-good was rejectable.

Figure 6:
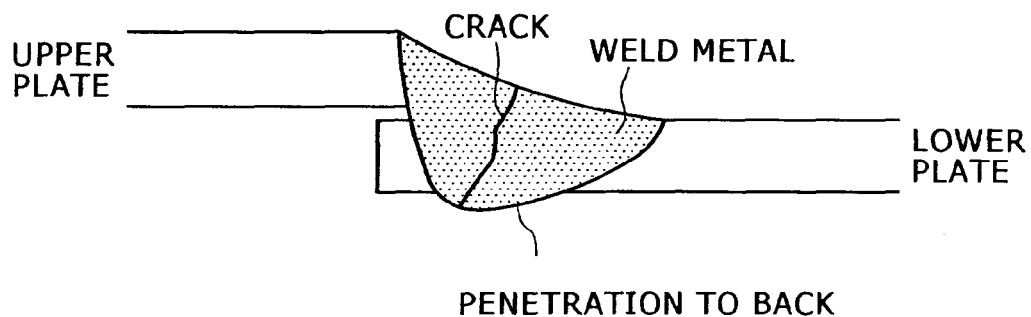
FIG. 6 is a diagram for explaining a crack to be an evaluation object in evaluation of crack resistance.

All samples in which cracks were found were investigated, as a result, crack morphology was recognized as a longitudinal crack in an approximately central portion of bead width as shown in FIG. 6. Moreover, as a result of fracture observation, the hot cracking was recognized as solidification cracking. FIG. 6 is a diagram for explaining a crack to be an evaluation object in evaluation of the crack resistance.

(5) Spatter Production

Welding was performed in bead-on-plate welding at a current of 200 A and a voltage that was set using enlarged projection near arc such that arc length is 2 mm, and produced spatter was collected by a collector box and measured in weight.

In evaluation of the spatter production, a sample with spatter production of more than 1.30 g/min and 1.50 g/min or less was evaluated to be good (a circle), and a sample with spatter production of 1.30 g/min or less was evaluated to be excellent (a double circle). On the contrary, a sample with the spatter production of more than 1.50 g/min was evaluated to be not-good (a cross). It was determined that the sample being good (a circle) and the sample being excellent (a double circle) were acceptable, and the sample being not-good (a cross) was rejectable.

(6) Feed Stability

Welding was performed for 1 hr in bead-on-plate welding at a feed rate of a solid wire of 6.00 m/min and a voltage at which arc length was 2 mm, so that stability was sensorily evaluated.

In evaluation of the feed stability, a sample in which a feed rate was not varied at all was evaluated to be excellent (a double circle), and a sample in which a feed rate was practically not problematic while it was slightly varied was evaluated to be good (a circle). On the contrary, a sample in which a feed rate was frequently varied, so that arc was unstable and determined to be unavailable for use was evaluated to be not-good (a cross). It was determined that the sample being excellent (a double circle) and the sample being good (a circle) were acceptable, and the sample being not-good (a cross) was rejectable.

(7) Encapsulation Ratio of Slag

An area ratio of slag produced on a bead was measured in order to evaluate possibility of separation of coating by separation of slag in electrode position coating performed after welding.

In evaluation of the encapsulation ratio of slag, a case that a ratio of the total area of slag to surface area of a bead was 4.0% or less was evaluated to be excellent (a double circle), and a case that the ratio was more than 4.0% and 5.0% or less was evaluated to be good (a circle). On the contrary, a case that such a ratio was more than 5.0% was evaluated to be not-good (a cross). It was determined that a sample being excellent (a double circle) and a sample being good (a circle) were acceptable, and a sample being not-good (a cross) was rejectable.

(8) Charpy Absorbed Energy

Charpy absorbed energy was measured according to JIS Z 3312 "MAG welding solid wire for mild steel and high strength steel" to conveniently evaluate impact resistance of a welded part, that is, conveniently evaluate whether weld metal in a welded part was embrittled or not. Three samples were tested at test temperature of 0° C., and an average value of them was provided for evaluation.

In evaluation of the Charpy absorbed energy, and a sample with Charpy absorbed energy of 70 J or more was evaluated to be excellent (a double circle), and a sample with Charpy absorbed energy of 27 J or more and less than 70 J was evaluated to be good (a circle). On the contrary, a sample with Charpy absorbed energy of less than 27 J was determined to be embrittled metal, and evaluated to be not-good (a cross). It was determined that the sample being good (a circle) and the sample being excellent (a double circle) were acceptable, and the sample being not-good (a cross) was rejectable.

Evaluation results of the evaluation items (1) to (8) are shown in Tables 4 to 6.

TABLE 4

| No. | Depth of undercut (mm) | | Hardness (HV) | | Cracks | Amount of spatter (g/min) | | Feed stability | Encapsulation ratio of slag (%) | | Absorbed energy (J) | | Critical feed rate (m/min) | | Remarks |
|---|---|---|---|---|---|---|---|---|---|---|---|---|---|---|---|
| 1 | 0.20 | ◎ | 174 | ○ | not found | 1.38 | ○ | ○ | 2.5 | ◎ | 65 | ○ | 7.49 | ◎ | example |
| 2 | 0.25 | ◎ | 181 | ○ | not found | 1.41 | ○ | ○ | 2.7 | ◎ | 68 | ○ | 7.49 | ◎ | example |
| 3 | 0.25 | ◎ | 172 | ○ | not found | 1.08 | ◎ | ◎ | 3.0 | ◎ | 100 | ◎ | 6.58 | ◎ | example |
| 4 | 0.30 | ◎ | 179 | ○ | not found | 1.16 | ◎ | ◎ | 3.2 | ◎ | 105 | ◎ | 6.58 | ◎ | example |
| 5 | 0.15 | ◎ | 174 | ○ | not found | 1.37 | ○ | ○ | 2.5 | ◎ | 63 | ○ | 7.71 | ◎ | example |
| 6 | 0.20 | ◎ | 181 | ○ | not found | 1.40 | ○ | ○ | 2.7 | ◎ | 65 | ○ | 7.71 | ◎ | example |
| 7 | 0.20 | ◎ | 172 | ○ | not found | 1.03 | ◎ | ◎ | 3.0 | ◎ | 101 | ◎ | 6.81 | ◎ | example |

TABLE 4-continued

| No. | Depth of undercut (mm) | | Hardness (HV) | | Cracks | Amount of spatter (g/min) | | Feed stability | Encapsulation ratio of slag (%) | | Absorbed energy (J) | | Critical feed rate (m/min) | | Remarks |
|---|---|---|---|---|---|---|---|---|---|---|---|---|---|---|---|
| 8 | 0.25 | ◉ | 172 | ○ | not found | 1.04 | ◉ | ○ | 3.2 | ◉ | 106 | ◉ | 6.81 | ◉ | example |
| 9 | 0.10 | ◉ | 174 | ○ | not found | 1.37 | ○ | ◉ | 2.5 | ◉ | 66 | ○ | 7.94 | ◉ | example |
| 10 | 0.15 | ◉ | 181 | ○ | not found | 1.40 | ○ | ◉ | 2.7 | ◉ | 67 | ○ | 7.94 | ◉ | example |
| 11 | 0.15 | ◉ | 172 | ○ | not found | 0.96 | ◉ | ◉ | 3.0 | ◉ | 102 | ◉ | 6.81 | ◉ | example |
| 12 | 0.20 | ◉ | 179 | ○ | not found | 1.09 | ◉ | ◉ | 3.2 | ◉ | 107 | ◉ | 6.81 | ◉ | example |
| 13 | 0.05 | ◉ | 174 | ○ | not found | 1.35 | ○ | ◉ | 2.5 | ◉ | 66 | ○ | 7.94 | ◉ | example |
| 14 | 0.10 | ◉ | 181 | ○ | not found | 1.38 | ○ | ◉ | 2.7 | ◉ | 64 | ○ | 7.94 | ◉ | example |
| 15 | 0.10 | ◉ | 172 | ○ | not found | 0.91 | ◉ | ◉ | 3.0 | ◉ | 103 | ◉ | 6.58 | ◉ | example |
| 16 | 0.15 | ◉ | 179 | ○ | not found | 0.99 | ◉ | ◉ | 3.2 | ◉ | 108 | ◉ | 6.58 | ◉ | example |
| 17 | 0.15 | ◉ | 174 | ○ | not found | 1.36 | ○ | ○ | 2.7 | ◉ | 63 | ○ | 7.94 | ◉ | example |
| 18 | 0.20 | ◉ | 181 | ○ | not found | 1.39 | ○ | ○ | 2.9 | ◉ | 64 | ○ | 7.94 | ◉ | example |
| 19 | 0.20 | ◉ | 172 | ○ | not found | 1.01 | ◉ | ○ | 3.2 | ◉ | 98 | ◉ | 6.81 | ◉ | example |
| 20 | 0.25 | ◉ | 179 | ○ | not found | 1.06 | ◉ | ○ | 3.4 | ◉ | 103 | ◉ | 6.81 | ◉ | example |
| 21 | 0.10 | ◉ | 174 | ○ | not found | 1.34 | ○ | ○ | 2.7 | ◉ | 64 | ○ | 8.17 | ◉ | example |
| 22 | 0.15 | ◉ | 181 | ○ | not found | 1.37 | ○ | ○ | 2.9 | ◉ | 65 | ○ | 8.17 | ◉ | example |
| 23 | 0.15 | ◉ | 172 | ○ | not found | 0.85 | ◉ | ○ | 3.2 | ◉ | 99 | ◉ | 7.03 | ◉ | example |
| 24 | 0.20 | ◉ | 172 | ○ | not found | 0.94 | ◉ | ○ | 3.4 | ◉ | 104 | ◉ | 7.03 | ◉ | example |
| 25 | 0.05 | ◉ | 174 | ○ | not found | 1.34 | ○ | ◉ | 2.7 | ◉ | 66 | ○ | 8.17 | ◉ | example |
| 26 | 0.10 | ◉ | 181 | ○ | not found | 1.37 | ○ | ◉ | 2.9 | ◉ | 68 | ○ | 8.17 | ◉ | example |
| 27 | 0.10 | ◉ | 172 | ○ | not found | 0.85 | ◉ | ◉ | 3.2 | ◉ | 100 | ◉ | 7.03 | ◉ | example |
| 28 | 0.15 | ◉ | 179 | ○ | not found | 0.94 | ◉ | ◉ | 3.4 | ◉ | 105 | ◉ | 7.03 | ◉ | example |
| 29 | 0 | ◉ | 174 | ○ | not found | 1.30 | ○ | ◉ | 2.7 | ◉ | 65 | ○ | 8.39 | ◉ | example |
| 30 | 0.05 | ◉ | 181 | ○ | not found | 1.33 | ○ | ◉ | 2.9 | ◉ | 67 | ○ | 8.39 | ◉ | example |
| 31 | 0.05 | ◉ | 172 | ○ | not found | 0.80 | ◉ | ◉ | 3.2 | ◉ | 101 | ◉ | 7.49 | ◉ | example |
| 32 | 0.10 | ◉ | 179 | ○ | not found | 0.89 | ◉ | ◉ | 3.4 | ◉ | 106 | ◉ | 7.49 | ◉ | example |
| 33 | 0.20 | ◉ | 176 | ○ | not found | 1.20 | ◉ | ○ | 2.7 | ◉ | 69 | ○ | 7.71 | ◉ | example |

TABLE 5

| No. | Depth of undercut (mm) | | Hardness (HV) | | Cracks | Amount of spatter (g/min) | | Feed stability | Encapsulation ratio of slag (%) | | Absorbed energy (J) | | Critical feed rate (m/min) | | Remarks |
|---|---|---|---|---|---|---|---|---|---|---|---|---|---|---|---|
| 34 | 0.15 | ◉ | 165 | ○ | not found | 1.35 | ○ | ○ | 2.6 | ◉ | 47 | ○ | 7.71 | ◉ | example |
| 35 | 0.35 | ○ | 182 | ○ | not found | 1.40 | ○ | ○ | 4.1 | ○ | 40 | ○ | 5.90 | ○ | example |
| 36 | 0.30 | ◉ | 182 | ○ | not found | 1.35 | ○ | ◉ | 4.3 | ○ | 40 | ○ | 6.35 | ○ | example |
| 37 | 0.40 | ○ | 161 | ○ | not found | 0.99 | ◉ | ◉ | 2.7 | ◉ | 76 | ◉ | 5.90 | ○ | example |
| 38 | 0.50 | ○ | 175 | ○ | not found | 1.45 | ○ | ○ | 4.5 | ○ | 80 | ◉ | 5.67 | ○ | example |
| 39 | 0.50 | ○ | 184 | ○ | not found | 1.42 | ○ | ◉ | 4.7 | ○ | 60 | ○ | 6.35 | ○ | example |
| 40 | 0.35 | ○ | 196 | ○ | not found | 1.44 | ○ | ◉ | 4.7 | ○ | 80 | ◉ | 7.03 | ◉ | example |
| 41 | 0.45 | ○ | 208 | ○ | not found | 1.43 | ○ | ◉ | 4.2 | ○ | 49 | ○ | 6.35 | ○ | example |
| 42 | 0.50 | ○ | 179 | ○ | not found | 1.18 | ◉ | ◉ | 4.1 | ○ | 102 | ◉ | 5.67 | ○ | example |
| 43 | 0.50 | ○ | 190 | ○ | not found | 1.46 | ○ | ○ | 4.1 | ○ | 76 | ◉ | 6.35 | ○ | example |
| 44 | 0.50 | ○ | 175 | ○ | not found | 1.45 | ○ | ◉ | 4.1 | ○ | 60 | ○ | 6.12 | ○ | example |
| 45 | 0.50 | ○ | 173 | ○ | not found | 1.42 | ○ | ○ | 4.6 | ○ | 99 | ◉ | 6.58 | ◉ | example |
| 46 | 0.50 | ○ | 175 | ○ | not found | 1.45 | ○ | ◉ | 3.4 | ◉ | 72 | ◉ | 5.67 | ○ | example |
| 47 | 0.40 | ○ | 184 | ○ | not found | 1.16 | ◉ | ◉ | 4.4 | ○ | 102 | ◉ | 6.35 | ○ | example |
| 48 | 0.15 | ◉ | 196 | ○ | not found | 1.35 | ○ | ◉ | 2.5 | ◉ | 66 | ○ | 7.49 | ◉ | example |
| 49 | 0.10 | ◉ | 208 | ○ | not found | 0.99 | ◉ | ◉ | 3.2 | ◉ | 80 | ◉ | 6.81 | ◉ | example |
| 50 | 0.50 | ○ | 179 | ○ | not found | 1.48 | ○ | ◉ | 4.2 | ○ | 95 | ◉ | 5.67 | ○ | example |
| 51 | 0.20 | ◉ | 190 | ○ | not found | 1.20 | ◉ | ◉ | 2.9 | ◉ | 76 | ◉ | 6.81 | ◉ | example |
| 52 | 0 | ◉ | 175 | ○ | not found | 1.32 | ○ | ○ | 2.7 | ◉ | 68 | ○ | 7.49 | ◉ | example |
| 53 | 0.25 | ◉ | 173 | ○ | not found | 1.26 | ◉ | ○ | 3.6 | ◉ | 90 | ◉ | 6.58 | ◉ | example |
| 54 | 0.20 | ◉ | 175 | ○ | not found | 1.29 | ◉ | ◉ | 3.8 | ◉ | 103 | ◉ | 6.58 | ◉ | example |
| 55 | 0.35 | ○ | 180 | ○ | not found | 0.91 | ◉ | ○ | 4.4 | ○ | 100 | ◉ | 6.12 | ○ | example |
| 56 | 0.30 | ◉ | 180 | ○ | not found | 0.85 | ◉ | ○ | 4.5 | ○ | 99 | ◉ | 6.35 | ○ | example |
| 57 | 0.40 | ○ | 170 | ○ | not found | 1.43 | ○ | ○ | 2.9 | ◉ | 75 | ◉ | 5.90 | ○ | example |
| 58 | 0.35 | ○ | 174 | ○ | not found | 1.44 | ○ | ○ | 3.1 | ◉ | 80 | ◉ | 5.67 | ○ | example |
| 59 | 0.35 | ○ | 176 | ○ | not found | 1.50 | ○ | ○ | 3.3 | ◉ | 80 | ◉ | 5.67 | ○ | example |
| 60 | 0.45 | ○ | 179 | ○ | not found | 1.42 | ○ | ○ | 4.1 | ○ | 92 | ◉ | 5.67 | ○ | example |
| 61 | 0.10 | ◉ | 174 | ○ | not found | 1.13 | ◉ | ◉ | 2.7 | ◉ | 78 | ◉ | 6.81 | ◉ | example |
| 62 | 0.10 | ◉ | 174 | ○ | not found | 1.40 | ○ | ◉ | 2.7 | ◉ | 80 | ◉ | 6.81 | ◉ | example |
| 63 | 0 | ◉ | 174 | ○ | not found | 1.03 | ◉ | ◉ | 2.7 | ◉ | 78 | ◉ | 7.49 | ◉ | example |
| 64 | 0.35 | ○ | 182 | ○ | not found | 1.28 | ◉ | ○ | 4.5 | ○ | 96 | ◉ | 5.67 | ○ | example |
| 65 | 0.10 | ◉ | 150 | X | not found | 0.84 | ◉ | ◉ | 2.5 | ◉ | 90 | ◉ | 6.81 | ◉ | comparative example |
| 66 | 0.55 | X | 200 | ○ | found | 1.64 | X | ◉ | 2.6 | ◉ | 94 | ◉ | 5.22 | X | comparative example |

TABLE 6

| No. | Depth of undercut (mm) | | Hardness (HV) | | Cracks | Amount of spatter (g/min) | | Feed stability | Encapsulation ratio of slag (%) | | Absorbed energy (J) | | Critical feed rate (m/min) | | Remarks |
|---|---|---|---|---|---|---|---|---|---|---|---|---|---|---|---|
| 67 | 0.55 | X | 153 | X | not found | 0.85 | ◎ | ◎ | 2.3 | ◎ | 102 | ◎ | 5.22 | X | comparative example |
| 68 | 0.55 | X | 187 | ○ | not found | 1.10 | ◎ | ◎ | 2.9 | ◎ | 22 | X | 5.22 | X | comparative example |
| 69 | 0.55 | X | 156 | X | not found | 0.94 | ◎ | ◎ | 2.3 | ◎ | 23 | X | 5.22 | X | comparative example |
| 70 | 0.60 | X | 151 | X | not found | 1.40 | ○ | ○ | 2.2 | ◎ | 20 | X | 4.99 | X | comparative example |
| 71 | 0.55 | X | 182 | ○ | not found | 1.20 | ◎ | ◎ | 5.2 | X | 106 | ◎ | 5.22 | X | comparative example |
| 72 | 0.60 | X | 183 | ○ | found | 1.41 | ○ | ○ | 5.9 | X | 20 | X | 4.99 | X | comparative example |
| 73 | 0.55 | X | 175 | ○ | found | 0.90 | ◎ | ◎ | 2.5 | ◎ | 78 | ◎ | 6.81 | ◎ | comparative example |
| 74 | 0.55 | X | 173 | ○ | found | 1.65 | X | ○ | 3.1 | ◎ | 22 | X | 6.81 | ◎ | comparative example |
| 75 | 0.55 | X | 175 | ○ | not found | 0.84 | ◎ | ◎ | 3.1 | ◎ | 103 | ◎ | 5.22 | X | comparative example |
| 76 | 0.60 | X | 176 | ○ | found | 1.60 | X | ◎ | 1.9 | ◎ | 19 | X | 7.26 | ◎ | comparative example |
| 77 | 0.55 | X | 200 | ○ | found | 1.80 | X | ○ | 3.3 | ◎ | 8 | X | 4.76 | X | comparative example |
| 78 | 0.55 | X | 180 | ○ | found | 1.11 | ◎ | ◎ | 2.7 | ◎ | 76 | ◎ | 7.03 | ◎ | comparative example |
| 79 | 0.60 | X | 179 | ○ | found | 1.44 | ○ | ○ | 3.5 | ◎ | 45 | ○ | 6.81 | ◎ | comparative example |
| 80 | 0.60 | X | 206 | ○ | found | 1.19 | ◎ | ◎ | 3.5 | ◎ | 80 | ◎ | 6.58 | ◎ | comparative example |
| 81 | 0.55 | X | 179 | ○ | not found | 1.54 | X | ◎ | 5.1 | X | 73 | ◎ | 5.22 | X | comparative example |
| 82 | 0.55 | X | 179 | ○ | not found | 1.53 | X | ◎ | 3.4 | ◎ | 106 | ◎ | 5.22 | X | comparative example |
| 83 | 0.55 | X | 176 | ○ | not found | 1.60 | X | ◎ | 5.1 | X | 54 | ○ | 5.22 | X | comparative example |
| 84 | 0.55 | X | 178 | ○ | not found | 1.52 | X | ◎ | 5.2 | X | 100 | ◎ | 5.22 | X | comparative example |
| 85 | 0.55 | X | 182 | ○ | not found | 1.58 | X | ◎ | 5.2 | X | 56 | ○ | 5.22 | X | comparative example |
| 86 | 0.55 | X | 182 | ○ | not found | 1.60 | X | ◎ | 5.1 | X | 56 | ○ | 5.22 | X | comparative example |
| 87 | 0.55 | X | 176 | ○ | not found | 1.58 | X | ◎ | 5.2 | X | 90 | ◎ | 5.22 | X | comparative example |
| 88 | 0.55 | X | 175 | ○ | not found | 1.53 | X | ◎ | 5.2 | X | 76 | ◎ | 5.22 | X | comparative example |
| 89 | 0.55 | X | 175 | ○ | not found | 1.53 | X | ◎ | 5.2 | X | 74 | ◎ | 5.22 | X | comparative example |
| 90 | 0.25 | ◎ | 180 | ○ | found | 1.01 | ◎ | ◎ | 2.8 | ◎ | 105 | ◎ | 6.81 | ◎ | comparative example |
| 91 | 0.60 | X | 185 | ○ | found | 1.28 | ◎ | ◎ | 3.3 | ◎ | 25 | X | 6.81 | ◎ | comparative example |
| 92 | 0.60 | X | 168 | ○ | found | 1.65 | X | ◎ | 5.5 | X | 26 | X | 7.03 | ◎ | comparative example |
| 93 | 0.60 | X | 165 | ○ | found | 1.83 | X | ○ | 5.3 | X | 22 | X | 7.13 | ◎ | comparative example |
| 94 | 0.55 | X | 220 | ○ | not found | 1.55 | X | ◎ | 3.4 | ◎ | 80 | ◎ | 5.22 | X | comparative example |
| 95 | 0.60 | X | 156 | X | found | 1.60 | X | ○ | 4.5 | ○ | 24 | X | 4.76 | X | comparative example |
| 96 | 0.70 | X | 237 | ○ | found | 1.90 | X | ○ | 10.5 | X | 156 | ◎ | 4.54 | X | comparative example |
| 97 | 0.60 | X | 178 | ○ | found | 1.40 | ○ | ○ | 5.7 | X | 21 | X | 7.26 | ◎ | comparative example |
| 98 | 0.55 | X | 185 | ○ | found | 1.35 | ○ | ○ | 5.9 | X | 45 | ○ | 5.44 | X | comparative example |
| 99 | 0.55 | X | 175 | ○ | not found | 1.25 | ◎ | ○ | 3.1 | ◎ | 65 | ○ | 5.22 | X | comparative example |
| 100 | 0.65 | X | 192 | ○ | not found | 1.00 | ◎ | ◎ | 3.5 | ◎ | 100 | ◎ | 4.76 | X | comparative example |

In Nos. 1 to 64, since compositions of solid wires satisfied the requirements of an embodiment of the invention, good evaluation results were able to be obtained in all the evaluation items of the critical feed rate (burn-through resistance), undercut resistance, hardness of weld metal, spatter production, feed stability of solid wire, encapsulation ratio of slag, and Charpy absorbed energy (impact resistance) (examples; see columns of remarks of Tables 4, 5 and 6).

On the other hand, in Nos. 65 to 100, since compositions of solid wires did not satisfy the requirements of an embodiment of the invention, evaluation results were obtained, in which a not-good result was obtained in one of the evaluation items (comparative examples; see columns of remarks of Tables 5 and 6). Specifically, description was made as follows.

In No. 65, since the content of C was excessively small, hardness was insufficient. That is, a welded part of weld metal was insufficient in strength, and not available for general purpose.

In No. 66, since the content of C was excessively large, deoxidization was excessive, so that the burn-through resistance and the undercut resistance were not good, in addition, the spatter production was large. Moreover, solidification cracking occurred.

In No. 67, since the content of each of Si and Mn was excessively small, hardness of weld metal was insufficient. That is, a welded part was insufficient in strength, and not available for general purpose. Moreover, since the solid wire was low in electric resistance, a current value per feed was increased, as a result, input heat and arc force were large, and consequently the burn-through resistance and the undercut resistance were not good.

In No. 68, since the content of Si was excessively large, deoxidization was excessive, so that the burn-through resistance and the undercut resistance were not good, showing embrittlement of the weld metal.

In Nos. 69 and 70, since the content of Mn was excessively small, hardness was insufficient. That is, a welded part was insufficient in strength, and not available for general purpose. Moreover, since the solid wire was low in electric resistance, a current value per feed was increased, as a result, input heat and arc force were large, and consequently the burn-through resistance and the undercut resistance were not good. Moreover, embrittlement of the weld metal was shown.

In No. 71, since the content of Mn was excessively large, deoxidization was excessive, so that the burn-through resistance and the undercut resistance were not good. Moreover, since a large amount of slag was produced, the encapsulation ratio of slag was increased. That is, bad painting adaptability was suggested.

In No. 72, since the content of each of Mn and N was excessively large, deoxidization was excessive, so that the burn-through resistance and the undercut resistance were not good. Moreover, since a large amount of slag was produced, the encapsulation ratio of slag was increased. That is, bad painting adaptability was suggested. Furthermore, embrittlement of the weld metal was shown, and cracks were induced due to inclusions.

In No. 73, since the content of P was excessively large, the solidification cracking occurred. Moreover, viscosity and surface tension of a molten pool were excessively small, thereby a bead was easy to drop due to a gravity effect, and consequently undercut at an upper plate side was easily induced. That is, the undercut resistance was not good.

In No. 74, since the content of P was excessively large, and a value calculated from the predetermined relational expression ((content of P)*{(content of O)+(content of N)}*$10^5$, hereinafter same as this) was excessively large, the solidification cracking occurred, in addition, embrittlement of the weld metal was shown. Moreover, since viscosity and surface tension of a molten pool were excessively small, a bead was easy to drop due to the gravity effect, and consequently undercut at an upper plate side was easily induced (the undercut resistance was not good). Furthermore, since viscosity and surface tension of a droplet were excessively small, the droplet was easily shorted to the molten pool, consequently extremely large amount of spatter was produced.

In No. 75, since the content of S was excessively small, viscosity and surface tension of a molten pool were not decreased to appropriate ranges. Therefore, the barrier effect for relieving arc force by the molten pool was not obtained. As a result, the burn-through resistance and the undercut resistance were not good.

In No. 76, since the content of S was excessively large, the solidification cracking occurred. Furthermore, since viscosity and surface tension of a droplet were excessively small, and thus the droplet was easily shorted to a molten pool, an extremely large amount of spatter was produced. Moreover, embrittlement of the weld metal was shown. While the burn-through resistance was good, since viscosity and surface tension of a molten pool were excessively small, a bead was easy to drop due to the gravity effect, and consequently undercut at an upper plate side was easily induced (the undercut resistance was not good).

In No. 77, the content of any of C, Si, and S was excessively large. Therefore, the solidification cracking occurred, the burn-through resistance and the undercut resistance were bad, and a large amount of spatter was produced. In addition, embrittlement of the weld metal was shown.

In Nos. 78, 79 and 80, while individual content of P, O and N satisfied the requirements of an embodiment of the invention, since the value calculated from the predetermined relational expression between P, O and N was high, the solidification cracking occurred. Moreover, viscosity and surface tension of a molten pool were excessively small, therefore a bead was easy to drop due to the gravity effect, and consequently undercut at an upper plate side was easily induced (the undercut resistance was not good).

In No. 81, since the content of Cr was excessively large, viscosity and surface tension of a molten pool were excessively large, so that the burn-through resistance and the undercut resistance were not good. Moreover, since a large amount of slag was produced, the encapsulation ratio of slag was increased. That is, bad painting adaptability was suggested. Furthermore, a large amount of spatter was produced.

In No. 82, since the content of Ni was excessively large, viscosity and surface tension of a molten pool were excessively large, so that the burn-through resistance and the undercut resistance were not good. Moreover, a large amount of spatter was produced.

In Nos. 83, 84, 85, 86, 87, 88 and 89, since the content of Al, Ti, Nb, V, Zr, La and Ce was excessively large respectively, viscosity and surface tension of a molten pool were excessively large. As a result, the burn-through resistance and the undercut resistance were not good. Moreover, a large amount of slag was produced, so that the encapsulation ratio of slag was increased. That is, bad painting adaptability was suggested. Furthermore, a large amount of spatter was produced.

In No. 90, since the content of B was excessively large, the solidification cracking occurred.

In No. 91, since the content of N was excessively large, while a blow hole was not produced, weld metal was embrittled. In addition, cracks were found due to inclusions. Moreover, since viscosity and surface tension of a molten pool were excessively small, a bead was easy to drop due to the gravity effect, and consequently undercut at an upper plate side was easily induced (the undercut resistance was not good).

In Nos. 92 and 93, since the content of O was excessively large, inclusions were increased, and the solidification cracking occurred. Since viscosity and surface tension of a droplet were excessively small, and thus the droplet was easily shorted to the molten pool, amount of spatter was extremely large. Moreover, embrittlement of the weld metal was shown. While the burn-through resistance was good, the molten pool was easy to drop by gravity, therefore undercut at the upper plate side was easily induced (the undercut resistance was not good). That is, the undercut resistance was not good. Moreover, a large amount of slag was produced, so that the encapsulation ratio of the slag was increased. That is, bad painting adaptability was suggested.

In No. 94, since the content of Mo was excessively large, viscosity and surface tension of a molten pool were excessively large. As a result, the burn-through resistance and the undercut resistance were not good. Moreover, a large amount of spatter was produced.

In No. 95, the content of each of Si and S was excessively small, the content of P was excessively large, and the value calculated from the predetermined relational expression between P, O and N was high. Therefore, since the content of Si was excessively small, hardness was insufficient. That is, a welded part was insufficient in strength, and therefore not able to be available for general purpose. Moreover, since electric resistance of the solid wire was low, a current value per feed was increased, consequently input heat or arc force was increased. In addition, since the content of S was excessively small, viscosity and surface tension of a molten pool were not decreased to appropriate ranges, therefore the barrier effect for relieving arc force by the molten pool was not obtained. Consequently, burn-through and undercut were easily induced (the burn-through resistance and the undercut resistance were not good). Since the content of P was excessively large, the solidification cracking occurred, and furthermore the undercut resistance was not good. Moreover, since the value calculated from the predetermined relational expression between P, O and N was high, a large amount of spatter was produced, and embrittlement of weld metal was shown.

In No. 96, the content of each of C, Mn, B and Mo was excessively large, and the content of S was excessively small. Therefore, the content of each of C and B was excessively large, leading to penetration welding, consequently cracking was induced. Moreover, since the content of each of C, Mn and Mo was excessively large, and the content of S was excessively small, viscosity and surface tension of a molten pool were significantly increased. As a result, the burn-through resistance and the undercut resistance were not good. Moreover, since the content of Mo was large, a large amount of spatter was produced. Furthermore, since the content of Mn was large, a large amount of slag was produced, consequently the encapsulation ratio of slag was increased. That is, bad painting adaptability was suggested.

In No. 97, the content of each of O and N was excessively large. Therefore, since viscosity of a molten pool was excessively small, a bead was easy to drop due to gravity, consequently undercut at an upper plate side was easily induced (the undercut resistance was not good). Moreover, inclusions were increased, and thus embrittlement of weld metal was shown, in addition, the solidification cracking occurred. Furthermore, a large amount of oxide slag was produced, consequently the encapsulation ratio of slag was increased. That is, bad painting adaptability was suggested.

In No. 98, the content of P was excessively small, and the content of O was excessively large. Therefore, since the content of P was excessively small, viscosity and surface tension of a molten pool were not decreased to appropriate ranges, therefore the barrier effect for relieving arc force by the molten pool was not obtained. Consequently, burn-through and undercut were easily induced (the burn-through resistance and the undercut resistance were not good). Moreover, since the content of O was excessively large, inclusions were increased, and thus the solidification cracking occurred, in addition, the undercut resistance was not good. Moreover, a large amount of oxide slag was produced, consequently the encapsulation ratio of slag was increased. That is, bad painting adaptability was suggested.

In No. 99, since the content of P was excessively small, viscosity and surface tension of a molten pool were not decreased to appropriate ranges, therefore the barrier effect for relieving arc force by the molten pool was not obtained. Consequently, burn-through and undercut were easily induced (the burn-through resistance and the undercut resistance were not good).

In No. 100, both the content of P and the content of S were excessively small. Therefore, viscosity and surface tension of a molten pool were not decreased to appropriate ranges, and therefore the barrier effect for relieving arc force by the molten pool was not obtained. Consequently, burn-through and undercut were easily induced (the burn-through resistance and the undercut resistance were not good).

What is claimed is:

1. A solid wire used for arc welding, comprising:
   C of 0.020 to 0.100 mass percent,
   Si of 0.25 to 1.10 mass percent,
   Mn of 1.20 to 1.65 mass percent,
   P of 0.008 to 0.017 mass percent,
   S of 0.057 to 0.150 mass percent,
   O of 0.0050 mass percent or less, and
   N of 0.0050 mass percent or less,
   wherein (content of P)×{(content of O)+(content of N)}× $10^5 \leq 15$ is satisfied, and
   the remainder including Fe and impurities,
   wherein the relevant impurities contain
   Ti of 0.15 mass percent or less,
   B of 0.0050 mass percent or less, and
   Cr, Ni, Al, Nb, V, Zr, La and Ce of 0.20 mass percent or less respectively.

2. The solid wire according to claim 1, further comprising: Mo of 0.30 mass percent or less.

3. The solid wire according to claim 1,
   wherein the solid wire includes K, Li, Na and Ca at 0.005 to 0.300 g in total per the solid wire of 10 kg on a surface of the solid wire.

4. The solid wire according to claim 1,
   wherein the solid wire includes $MoS_2$ of 0.01 to 1.00 g per the solid wire of 10 kg on a surface of the solid wire.

5. The solid wire according to claim 1,
   wherein a surface of the solid wire is covered with copper plating.

* * * * *